US010015540B2

(12) United States Patent
Jeon et al.

(10) Patent No.: US 10,015,540 B2
(45) Date of Patent: *Jul. 3, 2018

(54) METHOD OF PROVIDING INFORMATION AND DISPLAY DEVICE THEREOF

(71) Applicant: SAMSUNG ELECTRONICS CO., LTD., Suwon-si (KR)

(72) Inventors: Byung-jeong Jeon, Ansan-si (KR); Pill-kyoung Moon, Anyang-si (KR); Min-sun Park, Seoul (KR); Bong-hyun Cho, Suwon-si (KR); Su-gyeong Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,134

(22) Filed: Jan. 11, 2016

(65) Prior Publication Data
US 2016/0173932 A1 Jun. 16, 2016

Related U.S. Application Data

(63) Continuation of application No. 13/950,694, filed on Jul. 25, 2013, now Pat. No. 9,264,767.

(30) Foreign Application Priority Data

Jul. 25, 2012 (KR) .......................... 10-2012-0081435

(51) Int. Cl.
*H04N 21/442* (2011.01)
*H04N 21/433* (2011.01)
(Continued)

(52) U.S. Cl.
CPC ... *H04N 21/4316* (2013.01); *H04N 21/25883* (2013.01); *H04N 21/4147* (2013.01);
(Continued)

(58) Field of Classification Search
CPC ........... H04N 5/44543; H04N 21/4314; H04N 21/4316; H04N 21/482; H04N 21/4821
See application file for complete search history.

(56) References Cited

U.S. PATENT DOCUMENTS 6,822,661 B2 11/2004 Sai et al.
7,979,800 B2 7/2011 Hoshino et al.
(Continued)

FOREIGN PATENT DOCUMENTS

CN 101361364 A 2/2009
CN 101729856 A 6/2010
(Continued)

OTHER PUBLICATIONS

Communication dated Sep. 12, 2013, issued by the European Patent Office in counterpart European Application No. 13178027.2.
(Continued)

*Primary Examiner* — James R Marandi
(74) *Attorney, Agent, or Firm* — Sughrue Mion, PLLC

(57) ABSTRACT

A method for providing information which is performable by a display device is provided. The method includes: receiving at least one piece of broadcasting program information; obtaining at least one of viewing history information which relates to at least one piece of content that was watched before a predetermined point of time and recording information which relates to at least one piece of content that was recorded before the predetermined point of time; and displaying at least one piece of broadcasting program information from among the at least one piece of broadcasting program information which corresponds to the predetermined point of time on a first region of the display device based on the predetermined point of time, and displaying at least one of the viewing history information and the record-
(Continued)

ing information on a second region of the display device based on the predetermined point of time.

20 Claims, 19 Drawing Sheets

(51) Int. Cl.
    *H04N 21/431*    (2011.01)
    *H04N 21/45*     (2011.01)
    *H04N 21/482*    (2011.01)
    *H04N 21/84*     (2011.01)
    *H04N 21/258*    (2011.01)
    *H04N 21/4147*   (2011.01)
    *H04N 5/445*     (2011.01)
    *H04N 21/472*    (2011.01)

(52) U.S. Cl.
    CPC ..... *H04N 21/4312* (2013.01); *H04N 21/4334* (2013.01); *H04N 21/44204* (2013.01); *H04N 21/44222* (2013.01); *H04N 21/4532* (2013.01); *H04N 21/4821* (2013.01); *H04N 21/4826* (2013.01); *H04N 21/4828* (2013.01); *H04N 21/84* (2013.01); *H04N 5/44543* (2013.01); *H04N 21/4314* (2013.01); *H04N 21/47217* (2013.01); *H04N 21/482* (2013.01)

(56) References Cited

U.S. PATENT DOCUMENTS

| | | | |
|---|---|---|---|
| 8,661,471 | B2 | 2/2014 | Kitayama |
| 2002/0011988 | A1 | 1/2002 | Sai et al. |
| 2002/0138829 | A1 | 9/2002 | Matsumoto et al. |
| 2003/0140342 | A1 | 7/2003 | Hasebe et al. |
| 2006/0136965 | A1 | 6/2006 | Ellis et al. |
| 2007/0192793 | A1 | 8/2007 | Song et al. |
| 2007/0288964 | A1 | 12/2007 | Horiguchi |
| 2008/0226260 | A1 | 9/2008 | Yang et al. |
| 2009/0119328 | A1 | 5/2009 | Raza et al. |
| 2009/0119589 | A1 | 5/2009 | Rowell et al. |
| 2009/0274448 | A1 | 11/2009 | Kinoshita et al. |
| 2010/0107196 | A1 | 4/2010 | Kitayama |
| 2010/0262986 | A1 | 10/2010 | Adimatyam et al. |
| 2011/0246882 | A1 | 10/2011 | Kollenkark et al. |
| 2012/0027377 | A1 | 2/2012 | Tsukagoshi et al. |
| 2012/0030215 | A1 | 2/2012 | Herron et al. |
| 2012/0150990 | A1 | 6/2012 | Liou |

FOREIGN PATENT DOCUMENTS

| | | | |
|---|---|---|---|
| EP | 1049328 | A1 | 11/2000 |
| JP | 2002-044555 | A | 2/2002 |
| JP | 2006-279410 | A | 10/2006 |
| JP | 2007143183 | A | 6/2007 |
| JP | 2007202023 | A | 8/2007 |
| JP | 2007-281676 | A | 10/2007 |
| JP | 2007-300436 | A | 11/2007 |
| JP | 200892339 | A | 4/2008 |
| JP | 2010-108147 | A | 5/2010 |
| JP | 2012-075058 | A | 4/2012 |
| RU | 2010121746 | A | 12/2011 |
| TW | 201208353 | A1 | 2/2012 |
| TW | 201225669 | A1 | 6/2012 |
| WO | 2012087418 | | 6/2012 |

OTHER PUBLICATIONS

Written Opinion dated Oct. 25, 2013, issued by the International Searching Authority in counterpart International Application No. PCT/KR2013/006113.
International Searching Report dated Oct. 25, 2013, issued by the International Searching Authority in counterpart International Application No. PCT/KR2013/006113.
Communication dated Aug. 30, 2016 issued by the Intellectual Property Office of Taiwan in counterpart Taiwanese Patent Application No. 102125654.
Communication dated Nov. 23, 2016, issued by the Russian Patent Office in counterpart Russian Application No. 2015106148.
Communication dated May 10, 2017, issued by the Chinese Patent Office in counterpart Chinese Application No. 201310317155.3.
Communication dated Jul. 24, 2017, issued by the Japanese Patent Office in counterpart Japanese Application No. 2013-153381.
Communication dated Feb. 27, 2018, issued by the Chinese Patent Office in counterpart Chinese application No. 201310317155.3.

METHOD OF PROVIDING INFORMATION AND DISPLAY DEVICE THEREOF

CROSS-REFERENCE TO RELATED PATENT APPLICATION

This is a Continuation of U.S. application Ser. No. 13/950,694, filed Jul. 25, 2013, which claims priority from Korean Patent Application No. 10-2012-0081435, filed on Jul. 25, 2012, in the Korean Intellectual Property Office, the disclosure of which is incorporated herein by reference in its entirety.

BACKGROUND

1. Field

Exemplary embodiments relate to a method for providing broadcasting program information and at least one of viewing history information and recording information to a user, and a display device which is usable for implementing such a method.

2. Description of the Related Art

A "smart" television (smart TV) refers to a multifunctional TV which includes an Internet access function, so that a user may install various Internet-related applications in the smart TV and then may use various functions, such as, for example, web surfing, video-on-demand (VOD) viewing, a social network service (SNS), a game, or the like.

A particular feature of the smart TV is that the user and the smart TV may exchange information. This feature represents an important difference from conventional TVs that only deliver information one-way. Due to this feature, the smart TV is also called an "interactive TV."

However, it may be inconvenient for the user to use various functions of the smart TV. Thus, there is a need to develop a system that allows the user to easily search for and reproduce content via the smart TV.

SUMMARY

Exemplary embodiments provide a method for providing, by using a display device, broadcasting program information and at least one of viewing history information and recording information to a user, whereby the user may easily check a history which relates to one or more pieces of content that the user previously watched or recorded.

According to an aspect of one or more exemplary embodiments, there is provided a method for providing information which is performable by using a display device, the method including: receiving at least one piece of broadcasting program information; obtaining at least one of viewing history information which relates to at least a first piece of content that was watched before a predetermined point of time and recording information which relates to at least a second piece of content that was recorded before the predetermined point of time; and displaying at least one piece of broadcasting program information from among the at least one piece of broadcasting program information which corresponds to the predetermined point of time on a first region of the display device based on the predetermined point of time, and displaying at least one of the viewing history information and the recording information on a second region of the display device based on the predetermined point of time.

The displaying may include displaying the at least one piece of broadcasting program information which corresponds to the predetermined point of time on the first region that is arranged in a first direction with respect to a position that corresponds to the predetermined point of time, and displaying the at least one of the viewing history information and the recording information on the second region that is arranged in a second direction with respect to the position that corresponds to the predetermined point of time.

The first direction may be a rightward direction with respect to the position that corresponds to the predetermined point of time, and the second direction may be a leftward direction with respect to the position that corresponds to the predetermined point of time.

The predetermined point of time may include a present point of time.

The displaying the at least one piece of broadcasting program information may include arraying the at least one piece of broadcasting program information which corresponds to the predetermined point of time on the first region for a predetermined time interval.

The displaying the at least one of the viewing history information and the recording information may include extracting metadata which relates to at least one of the at least first piece of content that was watched before the predetermined point of time and the at least second piece of content that was recorded before the predetermined point of time; and arraying the at least one of the viewing history information and the recording information on the second region for a predetermined time interval, based on the extracted metadata.

The method may further include adjusting the predetermined time interval, based on information which relates to an amount of elapsed time.

The displaying the at least one of the viewing history information and the recording information may include lattice-arraying the at least one of the viewing history information and the recording information on the second region.

The displaying the at least one of the viewing history information and the recording information may include changing the predetermined point of time, in response to a received user input; and displaying at least one of viewing history information which relates to at least one piece of content that was watched before the changed predetermined point of time and recording information which relates to at least one piece of content that was recorded before the changed predetermined point of time on the second region.

The displaying the at least one of the viewing history information and the recording information may include receiving a search word from a user; and displaying at least one of viewing history information which corresponds to the search word and recording information which corresponds to the search word on the second region.

The receiving the search word may include receiving a selection input with respect to at least one category.

The displaying the at least one of the viewing history information and the recording information may include receiving user identification (ID) information; and displaying at least one of viewing history information which corresponds to the user ID information and recording information which corresponds to the user ID information on the second region.

The displaying the at least one of the viewing history information and the recording information may include mapping the at least one of the viewing history information and the recording information with respect to a calendar and displaying the at least one of the viewing history information and the recording information based on a result of the mapping.

The viewing history information may include information which relates to content that is watchable via an external device.

The method may further include determining a recommendation with respect to content, based on the at least one of the viewing history information and the recording information; and displaying a mark on broadcasting program information that corresponds to the recommendation from among the at least one piece of broadcasting program information which is displayed on the first region.

The determining the recommendation may include determining the recommendation based on at least one of viewing history information and recording information which relates to a second user that is related to a first user of the display device.

The method may further include automatically recording at least one piece of broadcasting content, based on the viewing history information and the recording information.

The method may further include performing at least one of displaying broadcasting alarm information which relates to the recommendation on a screen of the display device and transmitting the broadcasting alarm information to an external device.

The method may further include receiving a selection which relates to a content that is included in at least one of the viewing history information and the recording information that are displayed on the second region; and displaying additional information which corresponds to the received selection on a screen of the display device.

When the received selection relates to a current episode of a series-type content, the displaying the additional information may include displaying at least one of information which relates to a previously broadcasted episode and information which relates to an episode that is to be broadcasted in the future, on the screen of the display device.

According to another aspect of one or more exemplary embodiments, there is provided a display device which includes: a broadcasting program information management unit which is configured to receive at least one piece of broadcasting program information; a history management unit which is configured to obtain at least one of viewing history information which relates to at least a first piece of content that was watched before a predetermined point of time and recording information which relates to at least a second piece of content that was recorded before the predetermined point of time; a display unit which is configured to display at least one piece of broadcasting program information from among the at least one piece of broadcasting program information which corresponds to the predetermined point of time on a first region based on the predetermined point of time, and which is configured to display at least one of the viewing history information and the recording information on a second region based on the predetermined point of time; and a control unit which is configured to control the broadcasting program information management unit, the history management unit, and the display unit.

The display unit may be further configured to display the at least one piece of broadcasting program information which corresponds to the predetermined point of time on the first region that is arranged in a first direction with respect to a position that corresponds to the predetermined point of time, and may be further configured to display at least one of the viewing history information and the recording information on the second region that is arranged in a second direction with respect to the position that corresponds to the predetermined point of time.

The display unit may be further configured to array the at least one piece of broadcasting program information which corresponds to the predetermined point of time on the first region for a predetermined time interval.

The control unit may be further configured to extract metadata which relates to at least one of the at least first piece of content that was watched before the predetermined point of time and the at least second piece of content that was recorded before the predetermined point of time, and the display unit may be further configured to array the at least one of the viewing history information and the recording information on the second region for a predetermined time interval, based on the extracted metadata.

The control unit may be further configured to adjust the predetermined time interval, based on information which relates to an amount of elapsed time.

The display unit may be further configured to lattice-array the at least one of the viewing history information and the recording information on the second region.

The control unit may be further configured to change the predetermined point of time, in response to a received user input, and the display unit may be further configured to display at least one of viewing history information which relates to at least one piece of content that was watched before the changed predetermined point of time and recording information which relates to at least one piece of content that was recorded before the changed predetermined point of time on the second region.

The display device may further include a user input unit which is configured to receive a search word from a user, and the display unit may be further configured to display at least one of viewing history information which corresponds to the search word and recording information which corresponds to the search word on the second region.

The user input unit may be further configured to receive a selection input with respect to at least one category from the user.

The display device may further include a user input unit which is configured to receive user identification (ID) information, and the display unit may be further configured to display at least one of viewing history information which corresponds to the user ID information and recording information which corresponds to the user ID information on the second region.

The display unit may be further configured to map the at least one of the viewing history information and the recording information with respect to a calendar and to display the at least one of the viewing history information and the recording information based on a result of the mapping.

The display device may further include a recommendation unit which is configured to determine a recommendation with respect to content, based on the at least one of the viewing history information and the recording information, and the display unit may be further configured to display a mark on broadcasting program information that corresponds to the recommendation from among the at least one piece of broadcasting program information which is displayed on the first region.

The recommendation unit may be further configured to determine the recommendation based on at least one of viewing history information and recording information which relates to a second user that is related to a first user of the display device.

The control unit may be further configured to automatically record at least one piece of broadcasting content, based on the viewing history information and the recording information.

The display device may further include an alarm unit which is configured to perform at least one of displaying broadcasting alarm information which relates to the recommendation on a screen of the display device and transmitting the broadcasting alarm information to an external device.

The display device may further include a user input unit which is configured to receive a selection which relates to a content that is included at least one of the viewing history information and the recording information that are displayed on the second region, and the display unit may be further configured to display additional information which corresponds to the received selection on a screen of the display device.

When the received selection relates to a current episode of a series-type content, the display unit may be further configured to display at least one of information which relates to a previously broadcasted episode and information which relates to an episode that is to be broadcasted in the future, on the screen of the display device.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
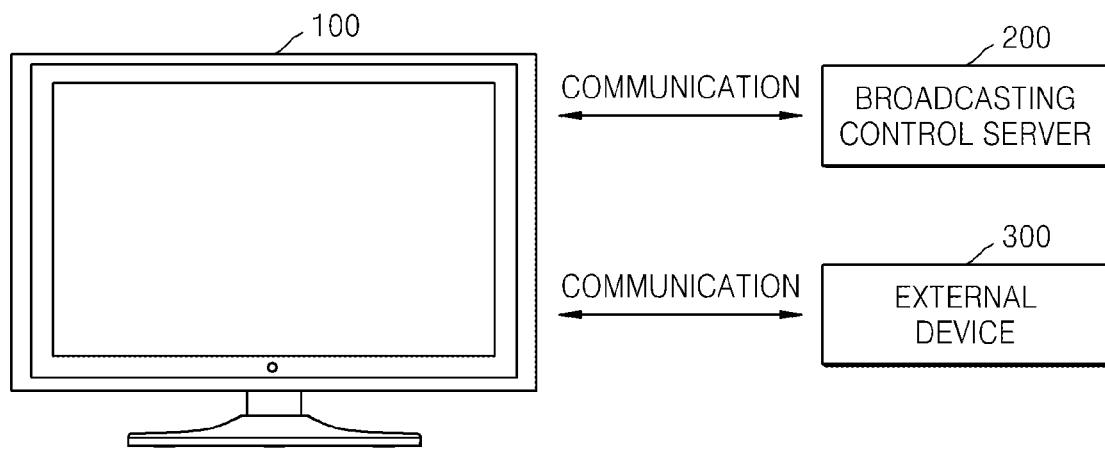
FIG. 1 is a diagram which illustrates an information providing system, according to an exemplary embodiment.

Hereinafter, terms that are used in the present disclosure will be briefly described, and then exemplary embodiments will be described in detail.

All terms including descriptive or technical terms which are used herein should be construed as having meanings that are known to one of ordinary skill in the art. However, the terms may have different meanings based on an intention of one of ordinary skill in the art, precedent cases, or the appearance of new technologies. In addition, some terms may be arbitrarily selected by the applicant, and in this case, the meaning of the selected terms will be described in detail herein. Thus, the terms used herein are defined based on the known meaning of the terms together with the description throughout the specification.

Further, when a part "includes" or "comprises" an element, unless there is a particular description contrary thereto, the part can further include other elements, not excluding the other elements. In the following description, terms such as "unit" and "module" indicate a component which is configured to perform at least one function or operation, wherein the unit and the block may be embodied as hardware or software or embodied by combining hardware and software.

The one or more exemplary embodiments will now be described more fully with reference to the accompanying drawings, in which exemplary embodiments are shown. The present inventive concept may, however, be embodied in many different forms, and should not be construed as being limited to the exemplary embodiments set forth herein; rather, these exemplary embodiments are described herein so that this disclosure will be thorough and complete, and will fully convey the concept of the present inventive concept to those of ordinary skill in the art. In the following description, well-known functions or constructions are not described in detail since they would obscure the present disclosure with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram which illustrates an information providing system, according to an exemplary embodiment. As illustrated in FIG. 1, the information providing system may include a display device 100, a broadcasting control server 200, an external device 300, and/or other suitable components which are compatible for operating as a part of the information providing system.

The display device 100 indicates any one or more of various types of devices having a display panel. For example, the display device 100 in the present exemplary embodiment may include, but is not limited thereto, a smart television (smart TV), an Internet Protocol TV (IPTV), a digital TV (DTV), a computer, a notebook computer, an electronic book terminal, a tablet personal computer (PC), a terminal for digital broadcasting, a personal digital assistant (PDA), a portable multimedia player (PMP), a navigation device, and consumer electronic (CE) devices (e.g., a refrigerator, an air conditioner, or the like which have a display panel).

The display device 100 may display broadcasting program information on a screen. In the present exemplary embodiment, the broadcasting program information refers to information which relates to one or more pieces of broadcasting content which is provided by a content provider for user convenience in selecting a channel.

For example, the broadcasting program information may include at least one of a title of a broadcasting program, a name of a channel, broadcasting times (e.g., a start time, an end time, and an elapsed time), a grade, a type of a program, a representative image, and detailed information (e.g., names of cast members, a director, a producer, re-broadcasting information, a synopsis, a preview menu, and a prelisten menu).

The broadcasting program information may have one of various formats. For example, the broadcasting program information may exist as Electronic Program Guide (EPG) information of a Digital Multimedia Broadcasting (DMB) service, as Electronic Service Guide (ESG) information of a Digital Video Broadcast-Handheld (DVB-H) service, or any other suitable format for providing broadcasting program information.

The broadcasting program information (e.g., the EPG information) may vary based on a region of a user, broadcasting types (e.g., terrestrial broadcasting, cable broadcasting, a communication satellite (CS), a broadcasting satellite (BS), or the like), and/or any other relevant parameter.

The display device 100 may reproduce any one or more of various types of content. For example, the display device 100 may reproduce moving picture content (e.g., a TV program image, video-on-demand (VOD), a personal image such as User-Created Contents (UCC), a music video, a YouTube video, or the like), still image content (e.g., a photo, a picture, or the like), text content (e.g., an electronic book (poetry, novels, or the like), a letter, a work file, a web-page, or the like), audio content (for example, music, radio broadcasting, or the like), an application (a widget, a game, videotelephony, or the like), and/or any other suitable type of content.

The display device 100 may communicate with the broadcasting control server 200 and the external device 300 via a network. The network may be implemented by using wireless communication technology such as, for example, wireless fidelity (Wi-Fi), a home radio frequency (RF), Bluetooth, a High Rate-Wireless Personal Area Network (HR-WPAN), an ultra-wide band (UWB), a Low Rate-Wireless Personal Area Network (LR-WPAN), the Institute of Electrical and Electronics Engineers (IEEE) 1394 standard, and/or any other suitable wireless communication technology, and thus may allow the display device 100 to access the broadcasting control server 200, or may provide a data transmission path between devices. The broadcasting control server 200 may indicate a server that generates and transmits a broadcasting signal and/or broadcasting-related information, or may indicate a server that receives and transmits a previously-generated broadcasting signal and/or previously-generated broadcasting-related information to the display device 100. The broadcasting-related information may include information which relates to one or more of a broadcasting channel, a broadcasting program, and/or a broadcasting service provider.

The broadcasting signal may include not only a TV broadcasting signal, a radio broadcasting signal, and/or a data broadcasting signal, but may also include a broadcasting signal obtained by combining the data broadcasting signal and one of the TV broadcasting signal and the radio broadcasting signal. In particular, the display device 100 may separately receive only the data broadcasting signal or may receive a broadcasting signal which is formed of combined broadcasting content and broadcasting program information and then may extract the broadcasting program information from the broadcasting signal.

In the present exemplary embodiment, the broadcasting control server 200 may include a broadcasting station server that provides broadcasting content and broadcasting program information. In another exemplary embodiment, the broadcasting control server 200 may include a server that does not provide broadcasting content but provides only broadcasting program information.

The external device 300 may include one or more of a user terminal and/or a peripheral device of the display device 100. The peripheral device may include one or more of a Set-Top Box (STB), a Blue-ray Disc Player (BDP), a Digital Versatile Disc Player (DVDP), a Video Cassette Recorder (VCR), a personal computer (PC), a Network Attached Storage (NAS) device, and/or any other suitable peripheral device. Further, the user terminal may include one or more of a mobile phone, a smart phone, a laptop computer, a tablet PC, an electronic book terminal, a PDA, a PMP, a navigation device, a digital camera, and/or any other suitable type of user terminal device.

Hereinafter, a method for providing information to a user by using the display device 100 will be described in detail with reference to FIG. 2.

Figure 2:
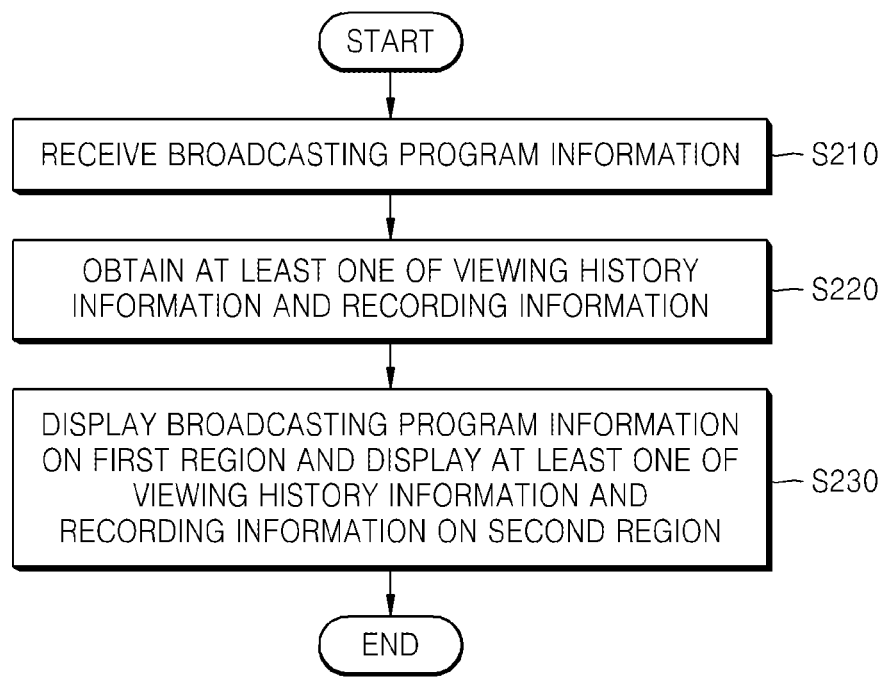
FIG. 2 is a flowchart which illustrates a method for providing information, which is performable by using a display device, according to an exemplary embodiment.

FIG. 2 is a flowchart which illustrates a method for providing information, which is performable by using the display device 100, according to an exemplary embodiment. Referring to FIG. 2, the method includes operations that are performed in chronological order by the display device 100 to be described with reference to FIGS. 17 and 18. Thus, hereinafter, although descriptions are omitted, if the descriptions are related to the display device 100 with reference to FIGS. 1 and 2, the descriptions may also be applied to the flowchart of FIG. 2.

In the present exemplary embodiment, in operation S210, the display device 100 may receive at least one piece of broadcasting program information. The broadcasting program information includes information which relates to content that is broadcast at a present point of time (or at a predetermined point of time) or that will be broadcast at a future point of time (or after the predetermined point of time). For example, as described above, the broadcasting program information may include one or more of a title of a broadcasting program, a name of a channel, broadcasting times (a start time, an end time, and an elapsed time), a grade, a representative image of a program, and/or any other suitable type of broadcasting program information.

The display device 100 may periodically receive the at least one piece of broadcasting program information from the broadcasting control server 200 and/or may request and receive broadcasting program information from the broadcasting control server 200.

In operation S220, the display device 100 may obtain at least one of viewing history information and recording information. The viewing history information includes information which relates to content that was watched by a user for at least a predetermined time period before the predetermined point of time. For example, when the predetermined point of time (or the present point of time) is 5:00 p.m. on Feb. 3, 2012, information which relates to content that was watched by the user for at least a predetermined time period (e.g., for about at least five minutes) before 5:00 p.m. on Feb. 3, 2012 may be included in the viewing history information.

In the present exemplary embodiment, the predetermined point of time may be arbitrarily set by the user, or may be automatically set by the display device 100. The predetermined point of time may be a present point of time, a past point of time, or a future point of time.

For example, when the user does not arbitrarily set the predetermined point of time, the display device 100 may obtain the viewing history information (or the recording information), based on a present point of time. In this case, the predetermined point of time may be automatically set as the present point of time by the display device 100.

Further, when the predetermined point of time is set as a time (e.g., 5:00 p.m. yesterday) that is before today and that is set by the user, information which relates to one or more pieces of content that were watched prior to 5:00 p.m. yesterday by the user may be obtained as the viewing history information. Thus, if particular content has been watched today, the particular content may not be displayed in the viewing history information on the display device 100.

In the present exemplary embodiment, a predetermined watching (reproducing) time (e.g., watching content for at least five minutes) which is related to whether particular content is stored in the viewing history information may be arbitrarily set by the user, or may be automatically set by the display device 100. For example, the user may set a parameter that indicates that content that was watched for at least five minutes is stored in the viewing history information, or may set a parameter that indicates that content that was watched for at least 30 minutes is stored in the viewing history information. In the present exemplary embodiment, the viewing history information may include one or more of a title of watched content, a name of a channel that broadcast the content, a broadcast time, a total viewing time, a grade, a genre, an image of the watched content, an icon of the watched content, and/or any other relevant information with respect to viewing history. Further, the viewing history information may include information which relates to content that was watched by using the external device 300. For example, information which relates to content that the user watched by using at least one of the navigation device and a mobile terminal via DMB may be collected as the viewing history information.

In particular, according to the present exemplary embodiment, the display device 100 may receive the viewing history information, which relates to the content that was watched by using the external device 300, from the external device 300. More particularly, the display device 100 may directly receive the viewing history information from the external device 300 via near field communication (NFC).

For example, when the user watches content by using a mobile terminal via DMB outside and then goes into a house with the mobile terminal, the display device 100 may detect the mobile terminal that exists within a predetermined range (an NFC-available range). Then, the display device 100 may form a communication link with the mobile terminal and may obtain the viewing history information from the mobile terminal via the NFC link.

The NFC may include, but is not limited to, at least one of Bluetooth, ZigBee, Wi-Fi Direct (WFD), UWB, and infrared Data Association (IrDA).

In another exemplary embodiment, the display device 100 may obtain the viewing history information which relates to the content that was watched by using the external device 300 from a server. For example, the display device 100 may collect the viewing history information which relates to the content that was watched by using the external device 300 from the server that manages one or more pieces of viewing history information of the external device 300.

Further, when the user watches content by using the mobile terminal via DMB outside and then goes into the house with the mobile terminal, the mobile terminal may be automatically linked with a home gateway, and here, the display device 100 may receive the viewing history information which relates to the content that was watched by using the external device 300 via the home gateway. The home gateway may include an access point (AP).

In the present exemplary embodiment, the recording information includes information which relates to content that was recorded before a predetermined point of time. In the present exemplary embodiment, the recorded content may include at least one of content that was recorded during watching and content that was recorded as a result of pre-programming. The recording information may include at least one of a title of the recorded content, a name of a channel that broadcast the content, a recorded time, a total broadcast time, a grade, a genre, an image of the recorded content, and/or any other suitable information which relates to a recording.

In the present exemplary embodiment, in operation S230, the display device 100 may display broadcasting program information, which is from among a plurality of pieces of broadcasting program information and which corresponds to a predetermined point of time, on a first region based on the predetermined point of time, and may display at least one of the viewing history information and the recording information on a second region based on the predetermined point of time.

For example, the display device 100, by using a time table form, may display the broadcasting program information which corresponds to the predetermined point of time on the first region that is arranged in a first direction with respect to a position that corresponds to the predetermined point of time, and may display at least one of the viewing history information and the recording information on the second region that is arranged in a second direction with respect to the position that corresponds to the predetermined point of time.

The position that corresponds to the predetermined point of time may indicate a virtual temporal axis or region which corresponds to the predetermined point of time. In particular, in the present exemplary embodiment, the time table may be divided into the first region on which the broadcasting program information is displayed and the second region on which the viewing history information and the recording information are displayed, wherein the first region and the second region are divided with respect to the virtual temporal axis.

In the present exemplary embodiment, the position that corresponds to the predetermined point of time (e.g., the virtual temporal axis) may be or may not be displayed on a screen of the display device 100. Further, the virtual temporal axis that corresponds to the predetermined point of time may be a horizontal axis or a vertical axis. In particular, when the first direction is a rightward direction (or a leftward direction) and the second direction is a leftward direction (or a rightward direction), the virtual temporal axis that corresponds to the predetermined point of time may be the vertical axis, and conversely, when the first direction is an upward direction (or a downward direction) and the second direction is a downward direction (or an upward direction), the virtual temporal axis that corresponds to the predetermined point of time may be the horizontal axis.

In the present exemplary embodiment, the broadcasting program information may be displayed on a right-side region, and the viewing history information and/or the recording information may be displayed on a left-side region with respect to the position that corresponds to the predetermined point of time (e.g., the virtual temporal axis). For example, when the predetermined point of time is 8:00 a.m., the broadcasting program information which relates to content that is broadcast at or after 8:00 a.m. may be displayed on a right-side region, and information which relates to content that was watched or recorded before 8:00 a.m. may be displayed on a left-side region, wherein the right-side region and the left-side region are divided with respect to a virtual temporal axis that corresponds to 8:00 a.m.

Alternatively, the display device 100 may display broadcasting program information which relates to content that is currently being broadcasted or that is scheduled to be broadcasted at a later time on a left-side region, and may display viewing history information or recording information which relates to content that was watched or recorded on a right-side region, wherein the left-side region and the right-side region are divided with respect to a temporal axis that corresponds to a predetermined point of time (e.g., a present point of time).

Alternatively, the display device 100 may display the broadcasting program information which relates to the content that is currently being broadcasted or that is scheduled to be broadcasted at a later time on an upper region, and may display the viewing history information or the recording information which relates to that content that was watched or recorded on a lower region, wherein the upper region and the lower region are divided with respect to the temporal axis that corresponds to the predetermined point of time (e.g., the present point of time).

In particular, in the present exemplary embodiment, the first region on which the broadcasting program information is displayed and the second region on which the viewing history information and/or the recording information are displayed may be shown in one page, or may be shown in different pages.

In the present exemplary embodiment, the display device 100 may array one or more pieces of broadcasting program information that correspond to a predetermined point of time for a predetermined time interval. For example, when the predetermined point of time is 5:00 p.m. on Feb. 3, 2012, the display device 100 may obtain broadcasting program information which relates to 100 pieces of broadcasting content that are scheduled to be broadcasted at 5:00 p.m. on Feb. 3, 2012, and broadcasting program information which relates to 1000 pieces of broadcasting content that are scheduled to be broadcasted after 5:00 p.m. on Feb. 3, 2012. In this case, the display device 100 may display the broadcasting program information which relates to 1,100 pieces of content for a 30-minute time interval.

In the present exemplary embodiment, the display device 100 may display information which relates to one or more pieces of content that were watched at a past point of time and information which relates to one or more pieces of content that were recorded at a past point of time for a predetermined time interval. For example, the display device 100 may extract metadata which relates to content that was watched or recorded before a predetermined point of time. Then, based on the extracted metadata, the display device 100 may array at least one of viewing history information and recording information for a predetermined time interval in the second region. The metadata may include one or more of broadcasting time information, recording-time information, and/or any other suitable metadata.

The predetermined time interval may be adjusted based on information which relates to an amount of elapsed time. In particular, for example, one or more pieces of content which have been watched or recorded during a previous three months may be arrayed in seven-day intervals, one or more pieces of content which were watched or recorded during a period from one year ago to three months ago may be arrayed in 15-day intervals, one or more pieces of content which were watched or recorded in a period from three years ago to one year ago may be arrayed in 30-day intervals, and one or more pieces of content which were watched or recorded prior to three years ago may be arrayed in one-year intervals.

In the present exemplary embodiment, the display device 100 may lattice-array broadcasting program information which corresponds to the predetermined point of time, viewing history information which relates to content that was watched before the predetermined point of time, and recording information which relates to content that was recorded before the predetermined point of time.

Figure 3:
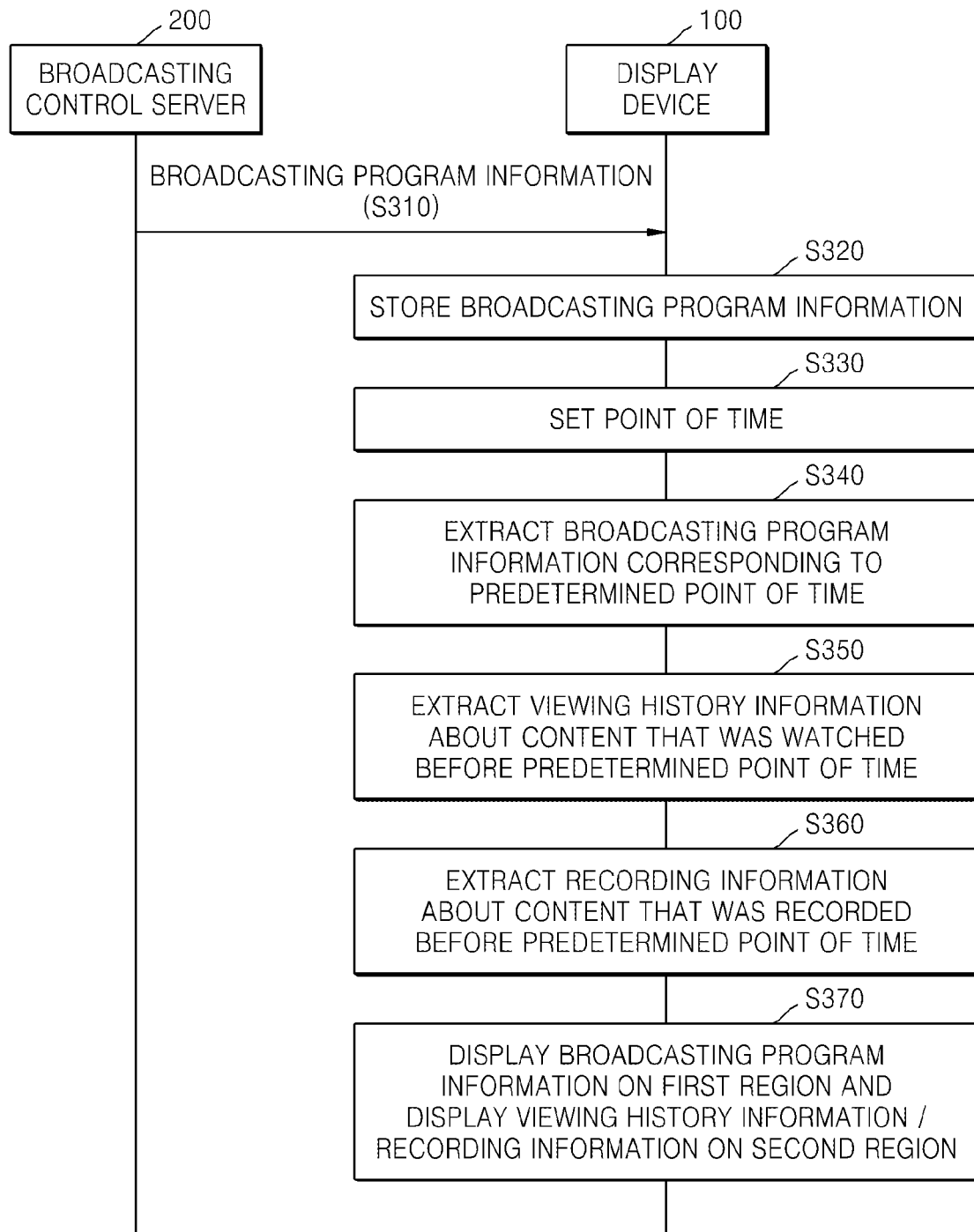
FIG. 3 is a flowchart which illustrates a method for providing information, which is performable by using the display device, according to another exemplary embodiment.

FIG. 3 is a flowchart which illustrates a method for providing information which is performable by using the display device 100, according to another exemplary embodiment. The features of the method of FIG. 3 which overlap with the features of the method of FIG. 2 will be omitted here.

As illustrated in FIG. 3, in operation S310, the display device 100 may receive broadcasting program information which relates to one or more broadcasting programs from the broadcasting control server 200. The broadcasting program information may include information which relates to one or more broadcasting programs that are broadcast in a period from a present point of time to a predetermined future point of time.

In operation S320, the display device 100 may store the received broadcasting program information in a memory. The stored broadcasting program information may be updated at regular intervals.

In operation S330, the display device 100 may set a point of time. In the present exemplary embodiment, the display device 100 may set the point of time based on a received user input. In particular, a user may input a desired point of time into the display device 100. In another exemplary embodiment, the display device 100 may automatically set the point of time as a present point of time.

In operation S340, the display device 100 may extract the broadcasting program information that corresponds to the set point of time (i.e., a predetermined point of time). The broadcasting program information that corresponds to the predetermined point of time indicates information which relates to one or more pieces of content which are scheduled to be broadcasted at the predetermined point of time or after the predetermined point of time. The broadcasting program information that corresponds to the predetermined point of time may include one or more of a title of a broadcasting program, a name of a channel, broadcasting times (a start time, an end time, and an elapsed time), a grade, a program image, and/or any other relevant information which relates to broadcast programs.

In operation S350, the display device 100 may extract viewing history information which relates to content that was watched before the predetermined point of time, from a memory or a cloud server. Further, in operation S360, the display device 100 may extract recording information which relates to content that was recorded before the predetermined point of time, from the memory or the cloud server.

In operation S370, based on the predetermined point of time, the display device 100 may display the extracted broadcasting program information which corresponds to the predetermined point of time in a first region, and may display the extracted viewing history information and/or the extracted recording information in a second region.

In the present exemplary embodiment, the display device 100 may change the point of time that is set in operation S330, i.e., the predetermined point of time, in response to a received user input. In this case, the display device 100 may extract viewing history information which relates to content that was watched before the changed point of time or recording information which relates to content that was recorded before the changed point of time from the memory or the cloud server, and may display the extracted information in the second region.

In the present exemplary embodiment, the display device 100 may provide each of a plurality of users with user-specific viewing history information and/or user-specific recording information. In particular, when user identification (ID) information is input, the display device 100 may display viewing history information and/or recording information that correspond to the user ID information in the second region.

The user ID information may include one or more of an ID, a nickname, a telephone number, and/or any other suitable type of identification information which are related to a user, and when the user uses a mobile terminal as a remote control device, the user ID information may further include one or more of a device ID, a unique serial number, a Media Access Control (MAC) address, an International Mobile Equipment Identity (IMEI), and/or any other suitable identifier of the remote control device.

For example, when a person AAA logs in by using his or her ID, the display device 100 may display AAA's viewing history information which relates to content that was watched by AAA before the predetermined point of time and/or recording information which relates to content that was recorded by AAA before the predetermined point of time in the second region.

A method for providing information which is performable by using the display device 100, will be described in detail with reference to FIGS. 4, 5, 6, and 7.

Figure 4:
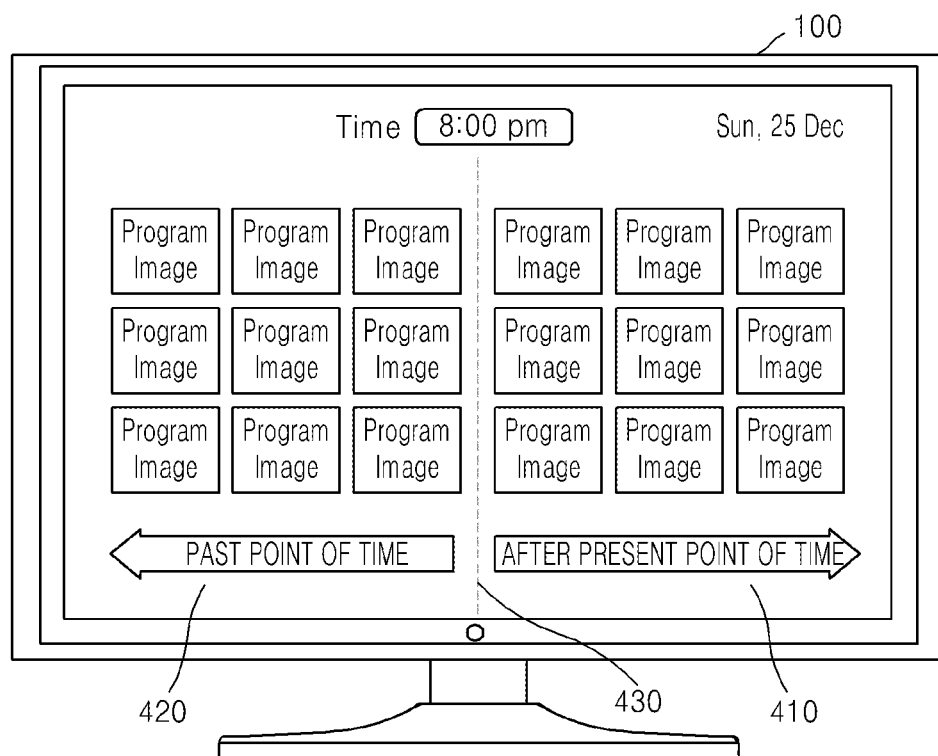
FIG. 4 is a diagram which illustrates an information providing screen of the display device, according to an exemplary embodiment.

FIG. 4 is a diagram of an information providing screen of the display device 100, according to an exemplary embodiment.

In the present exemplary embodiment, a user may set an arbitrary point of time for which the user wants to check broadcasting program information or viewing history information (or recording information). For example, it is assumed that a present time is 1:00 p.m. When the user wants to check current broadcasting program information, the user may set a temporal axis at 1:00 p.m. When the user wants to check a list of one or more pieces of content that the user watched before 10:00 a.m., the user may set the temporal axis at 10:00 a.m. Further, when the user wants to check broadcasting program information after 8:00 p.m., the user may set the temporal axis at 8:00 p.m.

In the present exemplary embodiment, if the user does not set the arbitrary point of time, the display device 100 may automatically set the temporal axis at a present point of time. Hereinafter, for convenience of description, it is assumed that the temporal axis is set at the present point of time.

As illustrated in FIG. 4, when the present time is 8:00 p.m., on December 25, the display device 100 may obtain broadcasting program information which relates to one or more pieces of content that are currently being broadcasted at 8:00 p.m., viewing history information which relates to one or more pieces of content that were watched before 8:00 p.m., and recording information which relates to one or more pieces of content that were recorded before 8:00 p.m.

The broadcasting program information, the viewing history information and the recording information may be already stored in a storage unit of the display device 100, or may be received in real-time from an external server or the external device 300.

In the present exemplary embodiment, the display device 100 may display the broadcasting program information which relates to one or more pieces of content that are being broadcasted at a present point of time (i.e., at 8:00 p.m.) and broadcasting program information which relates to one or more pieces of content that will be broadcast at a future point of time (i.e., after 8:00 p.m.) in a first region 410 in a rightward direction with respect to the temporal axis 430, and may display the viewing history information which relates to one or more pieces of content that were watched at a past point of time (i.e., before 8:00 p.m.) and/or recording information which relates to one or more pieces of content that were recorded at the past point of time (i.e., before 8:00 p.m.) in a second region 420 in a leftward direction with respect to the temporal axis 430, wherein the first region 410 and the second region 420 are divided with respect to the temporal axis 430 that corresponds to 8:00 p.m. (i.e., the present point of time).

The display device 100 may simply display the broadcasting program information, the viewing history information, and the recording information in the form of an icon. The icon may be a graphical user interface (GUI) that includes at least one of a program image, a name of a channel, and a title of a program.

Further, the display device 100 may display and distinguish between the viewing history information and the recording information by using a graphical effect. For example, an icon "watched" may be further displayed on watched content, and an icon "recorded" may be further displayed on recorded content.

Thus, according to the present exemplary embodiment, a user may easily check the broadcasting program information (e.g., an EPG) which corresponds to the predetermined point of time (i.e., the present point of time), and the viewing history information which relates to one or more pieces of content that were watched before the predetermined point of time (i.e., the present point of time) and the recording information which relates to one or more pieces of content that were recorded before the predetermined point of time (i.e., the present point of time).

According to the present exemplary embodiment, when the user selects specific content which is included in the displayed viewing history information, the display device 100 may directly access and reproduce the specific content that is selected by the user. In particular, the user may easily re-watch content that the user watched before, by using the viewing history information.

Further, according to the present exemplary embodiment, when the user selects specific content which is included in the displayed recording information, the display device 100 may directly access and reproduce the recorded specific content. In particular, the user may easily watch the recorded content, by using the recording information.

Figure 5:
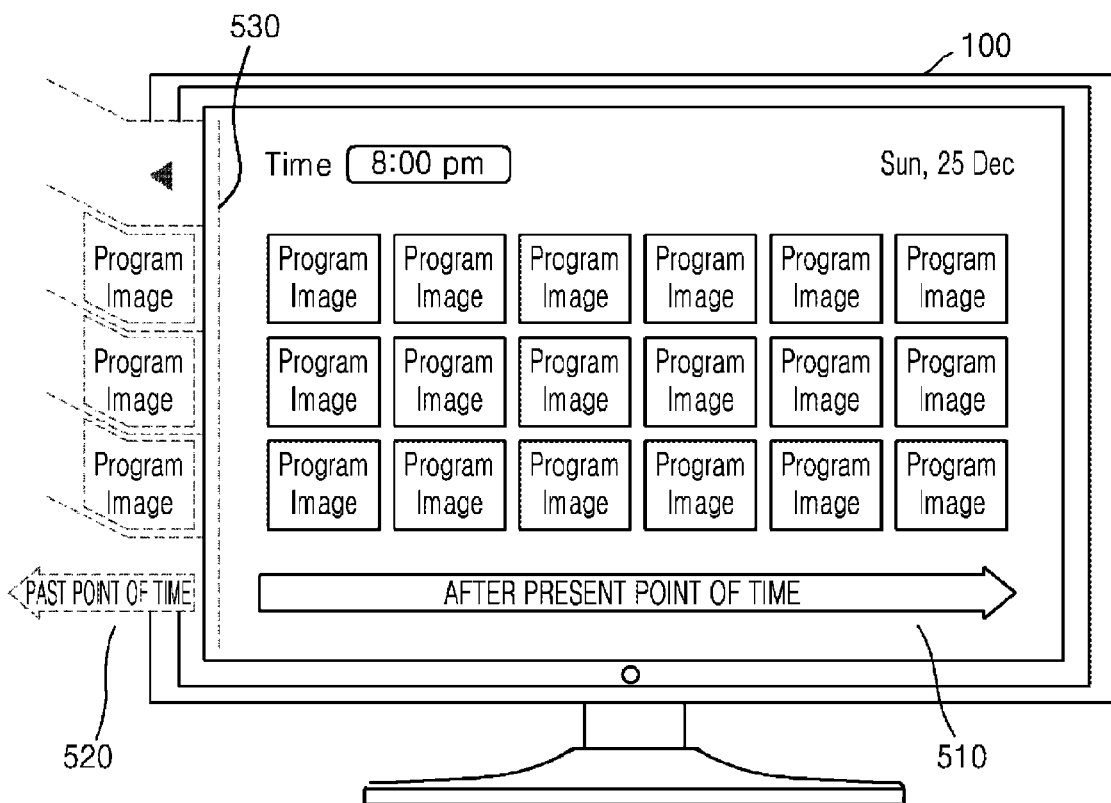
FIG. 5 is a diagram which illustrates an information providing screen of the display device, according to another exemplary embodiment.

FIG. 5 is a diagram of an information providing screen of the display device 100, according to another exemplary embodiment.

In the present exemplary embodiment, when a virtual temporal axis that corresponds to a predetermined point of time is located at a center of a screen (refer to FIG. 4), both a first region and a second region may be displayed together on the screen, but when the virtual temporal axis 530 that corresponds to the predetermined point of time is located at a farthest left side or a farthest right side (refer to FIG. 5), only one of the first region and the second region may be first displayed on the screen.

For example, as illustrated in FIG. 5, a first region 510 in which broadcasting program information which relates to content which is scheduled to be broadcasted after the predetermined point of time is displayed, and a second region 520 in which viewing history information which relates to content that was watched before the predetermined point of time and/or recording information which relates to a content that was recorded before the predetermined point of time may not be displayed together on one page.

In particular, the display device 100 may first display the broadcasting program information which relates to the content which is scheduled to be broadcasted after the predetermined point of time on a current page, and then may display the viewing history information and/or the recording information on a previous page or a next page.

Figure 6A:
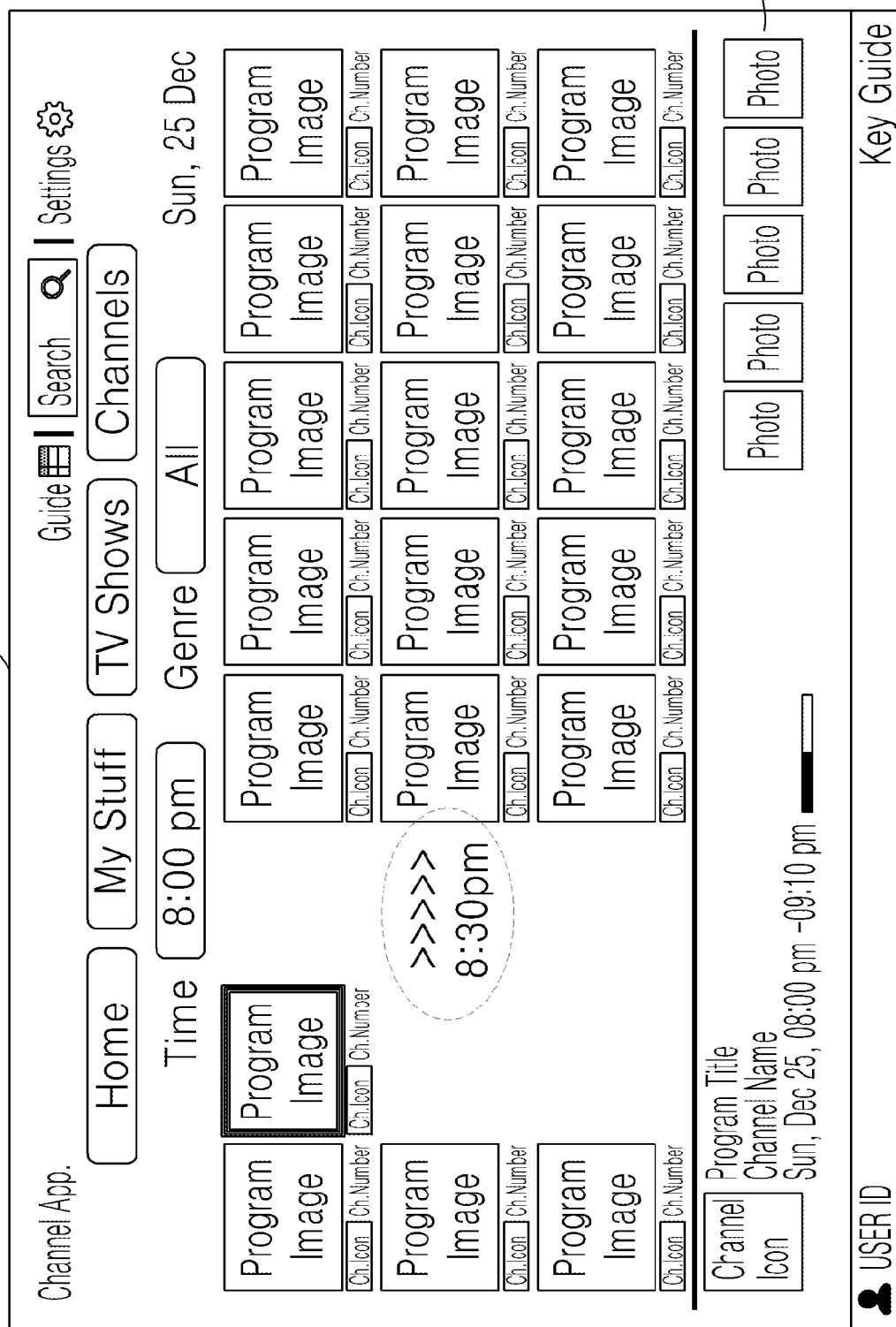
FIGS. 6A, 6B, and 6C illustrate broadcasting program information providing screens, according to an exemplary embodiment.
Figure 6B:
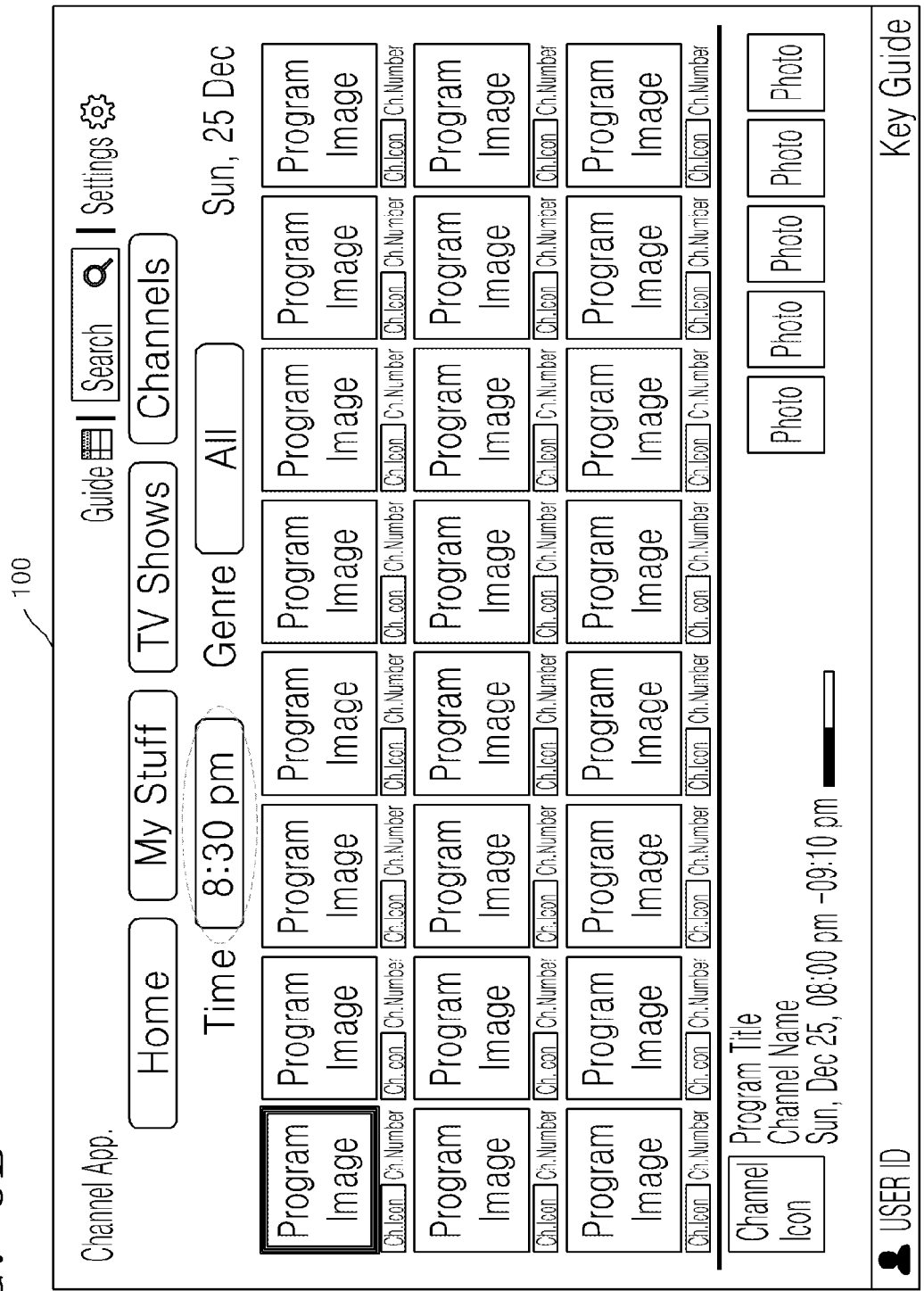
Figure 6C:
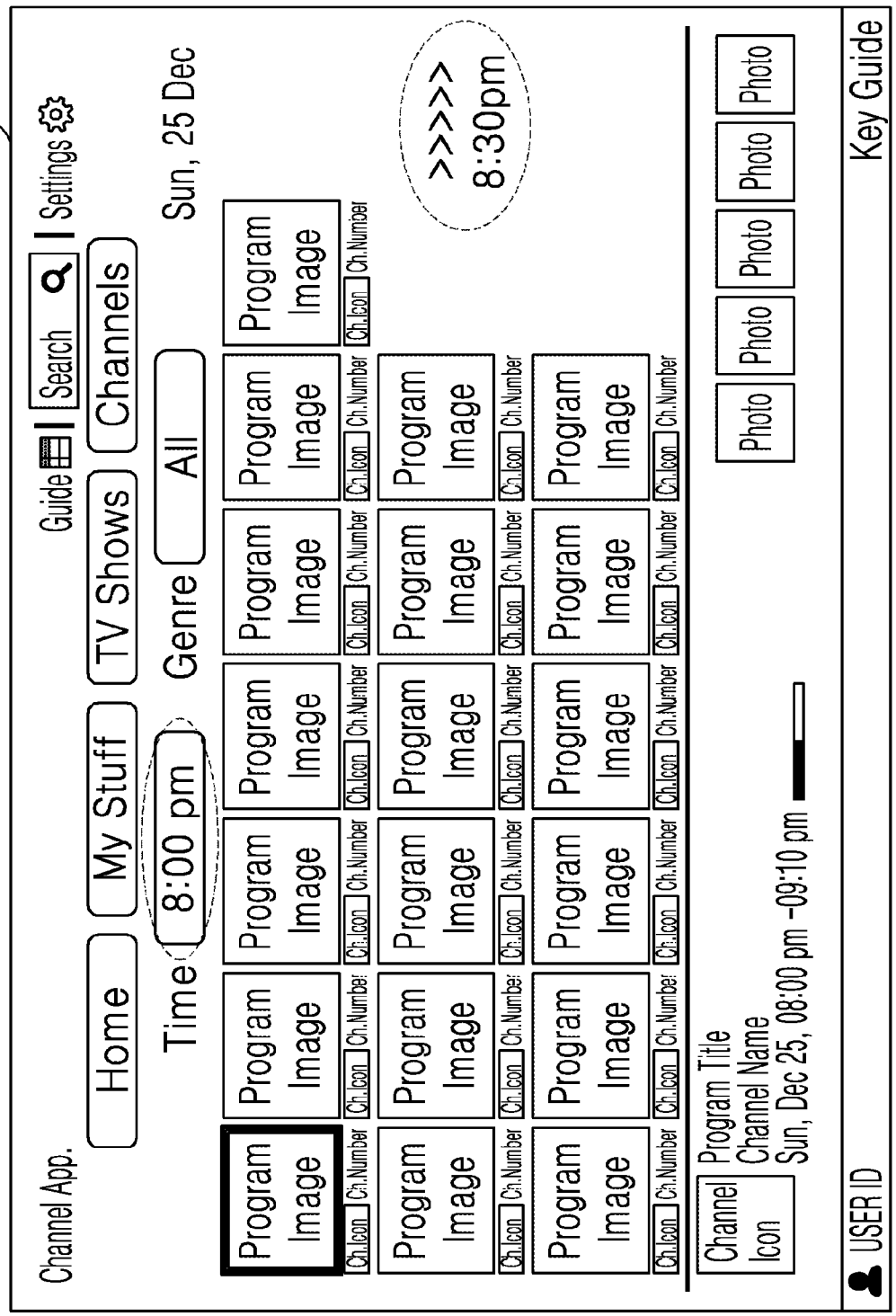

FIGS. 6A, 6B, and 6C illustrate broadcasting program information providing screens, according to an exemplary embodiment.

When there are a plurality of pieces of broadcasting program information that correspond to a predetermined point of time (e.g., a present point of time), the display device 100 may not display all of the plurality of pieces of broadcasting program information on one screen. In this case, the display device 100 may display the plurality of pieces of broadcasting program information on a first region in a first direction with respect to a temporal axis which corresponds to the predetermined point of time for a predetermined time interval. For convenience of description, it is assumed that the first direction indicates a rightward direction. In particular, the display device 100 may display the plurality of pieces of broadcasting program information on a right-side region for the predetermined time interval, wherein the right-side region is with respect to a temporal axis that corresponds to the present point of time.

As illustrated in FIG. 6A, when the present point of time is 8:00 p.m., the display device 100 may display broadcasting program information which relates to one or more pieces of content that are currently being broadcasted at 8:00 p.m., and broadcasting program information which relates to one or more pieces of content that will broadcasted after 8:00 p.m. for a 30-minute time interval. In particular, the display device 100 may group and display a plurality of pieces of broadcasting program information which relate to one or more pieces of broadcasting content that start between 8:00 p.m. and 8:30 p.m. in the form of a first block, may group and display a plurality of pieces of broadcasting program information which relate to one or more pieces of broadcasting content that start between 8:30 p.m. and 9:00 p.m. in the form of a second block, and may group and display a plurality of pieces of broadcasting program information which relate to one or more pieces of broadcasting content that start between 9:00 p.m. and 9:30 p.m. in the form of a third block. More particularly, in the present exemplary embodiment, the plurality of pieces of broadcasting program information displayed on each block may be displayed according to channels, respectively.

As illustrated in FIG. 6B, a user may move a selection region (e.g., a cursor pointer) in a rightward direction and thus may check the plurality of pieces of broadcasting program information in a next time block.

When the selection region is moved from the first block (8:00 p.m.) to the second block (8:30 p.m.), the display device 100 may display time information (8:30 p.m.) which corresponds to the second block on a screen. Further, when the selection region is moved from the first block to the second block, the display device 100 may control first broadcasting program information from among the plurality of pieces of broadcasting program information of the second block to be located on an uppermost leftmost position of the screen.

As illustrated in FIG. 6B, the user may move the selection region in a leftward direction and then may check the plurality of pieces of broadcasting program information in a previous time block. In particular, when the user moves the selection region to a further-left region than the temporal axis, the viewing history information and the recording information may be displayed. This will be described later with reference to FIGS. 7A and 7B.

In the present exemplary embodiment, the display device 100 may display additional information which relates to broadcasting program information related to the selection region on a third region 610. In particular, the third region 610 on which the broadcasting program information is displayed may differ from the first region on which the broadcasting program information is displayed, or may overlap with the first region.

The additional information may include any one or more of a title of a broadcasting program, a name of a channel, broadcasting times (i.e., a start time, an end time, and a running time), a grade, a type of a program, a representative image, detailed information (e.g., cast, a director, a producer, re-broadcasting information, a synopsis, a preview menu, and a prelisten menu), an episode number with respect to series-type content, and/or any other suitable type of information.

In particular, in the present exemplary embodiment, the display device 100 may provide the broadcasting program information in the form of a simple icon on the first region, and may provide detailed broadcasting program information on the third region 610.

In the present exemplary embodiment, when broadcasting program information which relates to broadcasting content that is currently being broadcasted is selected, the display device 100 may provide additional information that corresponds to information which relates to an acquaintance who watches the broadcasting content. In the present exemplary embodiment, the acquaintance may indicate other users that are connected via a social network service (SNS). The information which relates to the acquaintance may include a total number of acquaintances who currently watch the broadcasting content, IDs of the acquaintances, and/or any other information which is relevant to the acquaintance.

Figure 7A:
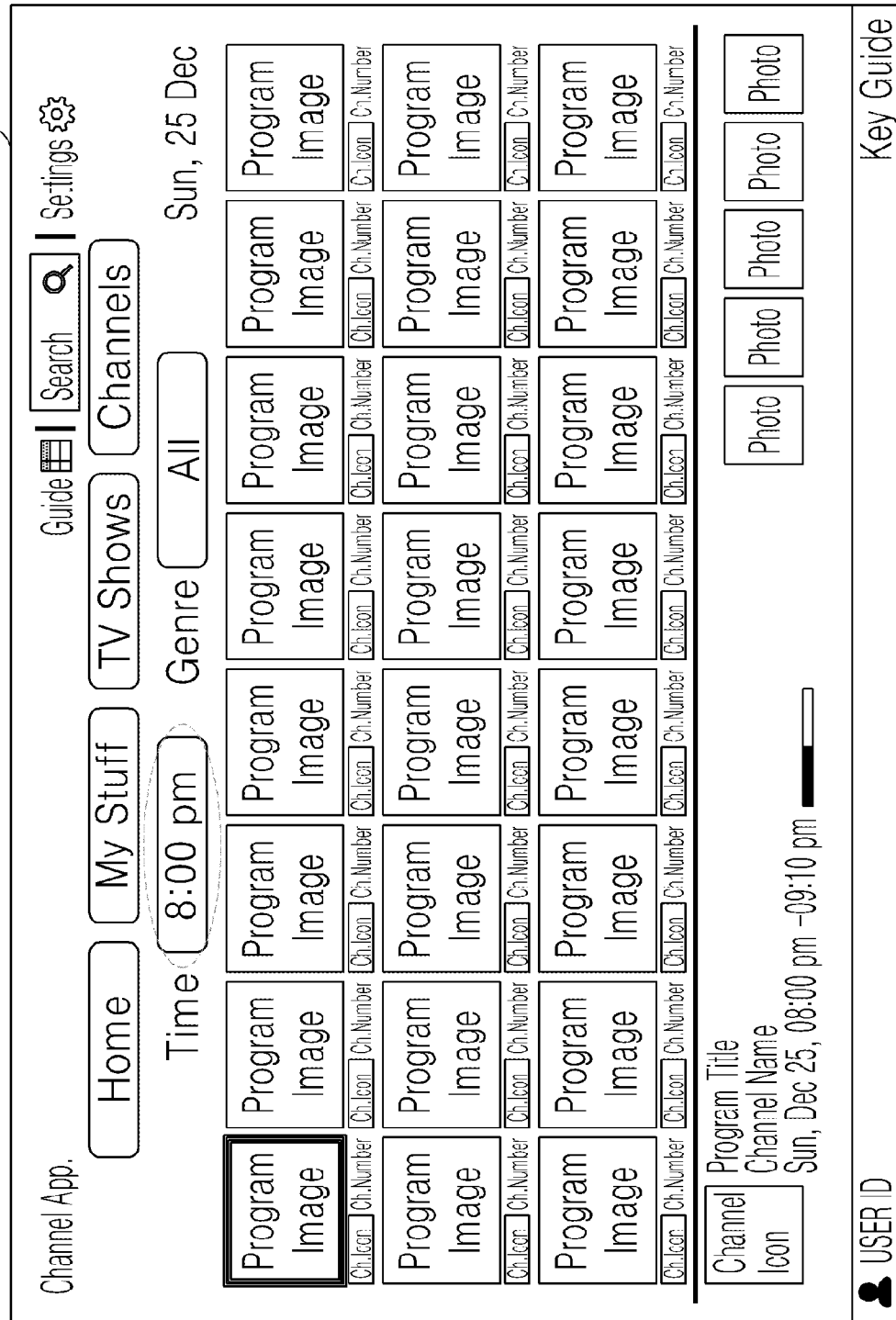
FIGS. 7A and 7B illustrate screens for providing at least one of viewing history information and recording information, according to an exemplary embodiment.
Figure 7B:
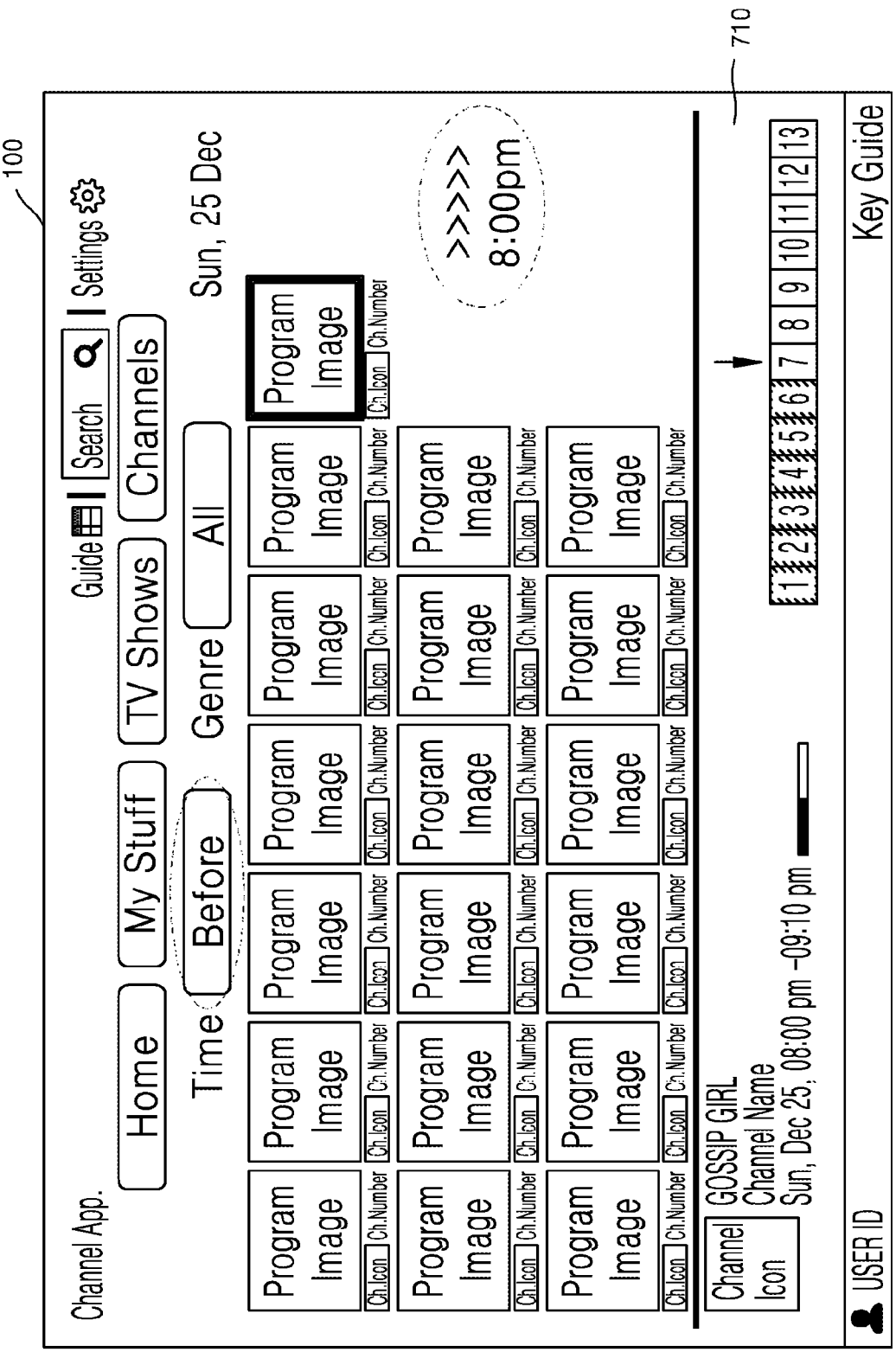

FIGS. 7A and 7B illustrate screens for providing at least one of viewing history information and recording information, according to an exemplary embodiment.

In one or more exemplary embodiments, the display device 100 may display at least one of viewing history information and recording information in a second region in a second direction with respect to a temporal axis which corresponds to a predetermined point of time for a predetermined time interval. For convenience of description, it is assumed that the second direction indicates a leftward direction. In particular, the display device 100 may display at least one of the viewing history information and the recording information in a left-side region for the predetermined time interval, wherein the left-side region is with respect to a temporal axis that corresponds to a present point of time.

As illustrated in FIG. 7A, the present point of time is 8:00 p.m., the display device 100 may display broadcasting program information which relates to one or more pieces of broadcasting content that are currently being broadcasted at 8:00 p.m., or that will be broadcasted after 8:00 p.m. in a first region (i.e., a right-side direction with respect to the temporal axis that corresponds to the present point of time).

In particular, as illustrated in FIG. 7B, when a user moves a selection region to a further-left region than the temporal axis, the display device 100 may display the viewing history information and/or the recording information on the screen. More particularly, the display device 100 may provide a graphical user interface (GUI) (e.g., Time: before) so as to inform the user that history information is being displayed.

In the present exemplary embodiment, the display device 100 may display additional information which relates to the viewing history information or the recording information related to the selection region on a third region 710. In particular, the third region 710 on which the additional information is displayed may differ from the second region on which the viewing history information or the recording information is displayed, or may overlap with the second region.

The additional information which relates to the viewing history information or the recording information may include any one or more of a title of a broadcasting program, a name of a channel, broadcasting times (i.e., a start time, an end time, and a running time), a grade, a type of a program, a representative image, detailed information (e.g., cast, a director, a producer, re-broadcasting information, a synopsis, a preview menu, and a prelisten menu), an episode number with respect to series-type content, and/or any other suitable type of information.

In the present exemplary embodiment, when recorded content or watched content is an episode of series-type content, the display device 100 may provide additional information indicating another episode that is not currently being watched and/or recorded. This will be described in detail with reference to FIGS. 15 and 16.

According to the present exemplary embodiment, the user may easily search for the broadcasting program information (e.g., an EPG), the viewing history information, and the recording information by moving the selection region (e.g., a cursor pointer) in a horizontal (or vertical) direction.

Figure 8:
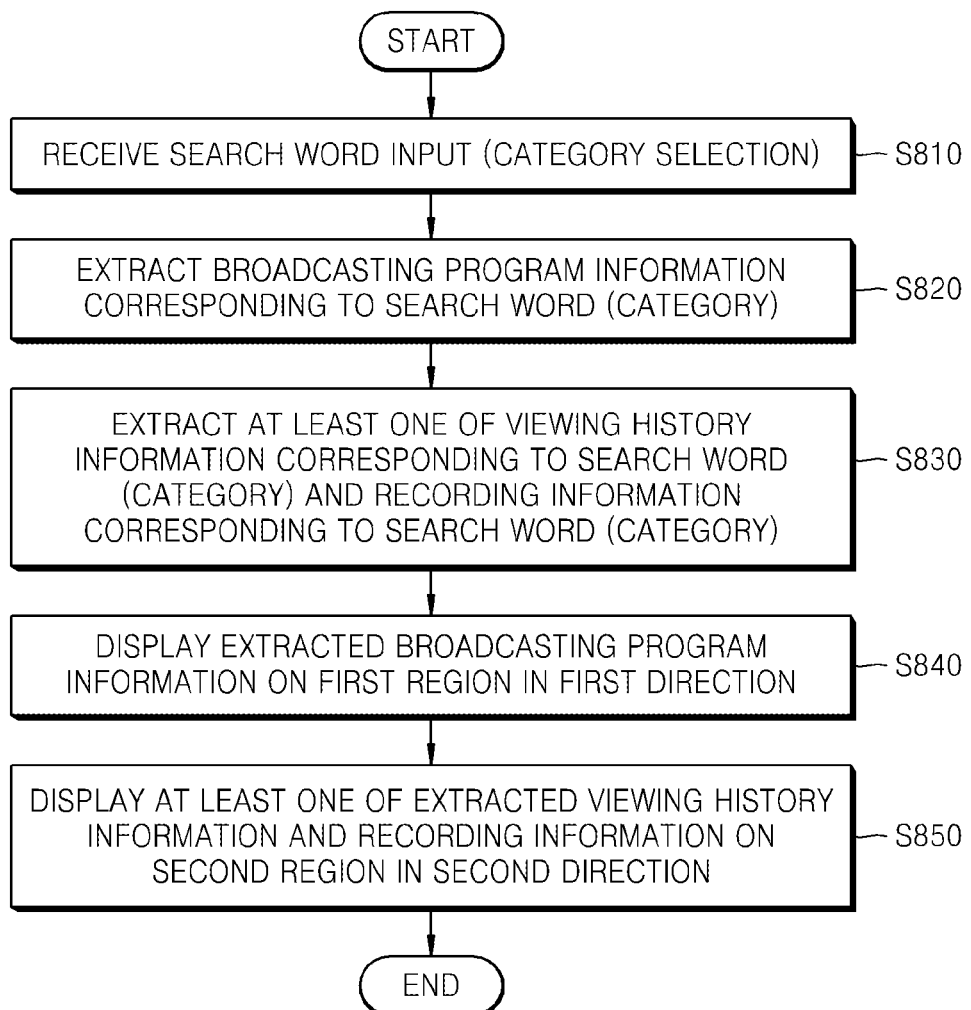
FIG. 8 is a flowchart which illustrates a method for providing information based on a search word (or a category), according to an exemplary embodiment.

FIG. 8 is a flowchart which illustrates a method for providing information based on a search word (or a category), according to an exemplary embodiment. Referring to FIG. 8, the method includes operations that are executed in chronological order by the display device 100 and that will be described with reference to FIGS. 17 and 18. Thus, hereinafter, although descriptions are omitted, if the descriptions are related to the display device 100 with reference to FIGS. 1 and 2, the descriptions may also be applied to the flowchart of FIG. 8.

In operation S810, the display device 100 may receive a search word from a user. In particular, the user may input a keyword which relates to desired content into the display device 100. In the present exemplary embodiment, when the display device 100 has a touch screen, the user may input the search word via a touch input. In another exemplary embodiment, when a remote control device that controls the display device 100 is a mobile terminal, the user may input the search word via a touch input, a bending input, a motion input, a key input, and/or any other suitable mode of user input.

In the present exemplary embodiment, the display device 100 may receive a selection input with respect to at least one category from a user. In the present exemplary embodiment, the category may include a category which relates to program genres (e.g., dramas, movies, sports, music, radio, entertainment, news, current issues, education, series, or the like), a category which relates to broadcasting channels (e.g., CH 5, CH 6, CH 7, or the like), a category which relates to producers, a category which relates to actors, a category which relates to cost and/or payment (e.g., free content and pay-per-view content), a category which relates to storage methods (e.g., server-stored content, locally-stored content, or the like), and/or any other suitable type of category.

Further, the display device 100 may further receive a selection input with respect to a sub-category. For example, the user may select "sports" from among genre categories that are provided by the display device 100, and may further select "baseball" as a sub-category from within the sports category.

The display device 100 may receive a selection input with respect to a plurality of categories. For example, the display device 100 may receive a selection input with respect to two categories of "drama" and "movie" from the user.

In operation S820, the display device 100 may extract broadcasting program information that corresponds to the search word (or the category) and that is from among a plurality of pieces of broadcasting program information that correspond to a predetermined point of time (e.g., a present point of time). In operation S840, the display device 100 may display the broadcasting program information that corresponds to the search word (or the category) on a first region in a first direction with respect to a temporal axis which corresponds to the predetermined point of time.

In particular, the display device 100 extracts only broadcasting content which is related to the search word (or the category) that is input by the user and that is from among one or more pieces of broadcasting content that are currently being broadcasted or that will be broadcasted in the future, and displays broadcasting program information which relates to the extracted broadcasting content on the first region. For example, when a present time is 4:00 p.m., and the user inputs a search word of "animation," the display device 100 may extract only broadcasting program information which relates to animation programs that are scheduled to be broadcasted after 4:00 p.m., and may display the broadcasting program information on the first region.

Further, when a present time is 8:00 p.m., and the user selects a drama-category, the display device 100 extracts only broadcasting program information which relates to one or more pieces of broadcasting content that are related to the drama-category and that are from among approximately 1,000 pieces of broadcasting content that are scheduled to be broadcasted after 8:00 p.m., and displays the broadcasting program information in the first region.

In operation S830, the display device 100 may extract viewing history information and/or recording information that correspond to the search word (or the category). In operation S850, the display device 100 may display the viewing history information and/or the recording information that correspond to the search word (or the category) on a second region in a second direction with respect to the temporal axis. For example, when the user inputs search words "World Cup," the display device 100 may extract only viewing history information and/or recording information related to World Cup matches, and may display the viewing history information and/or the recording information in the second region. This will be described with reference to FIG. 9.

Figure 9:
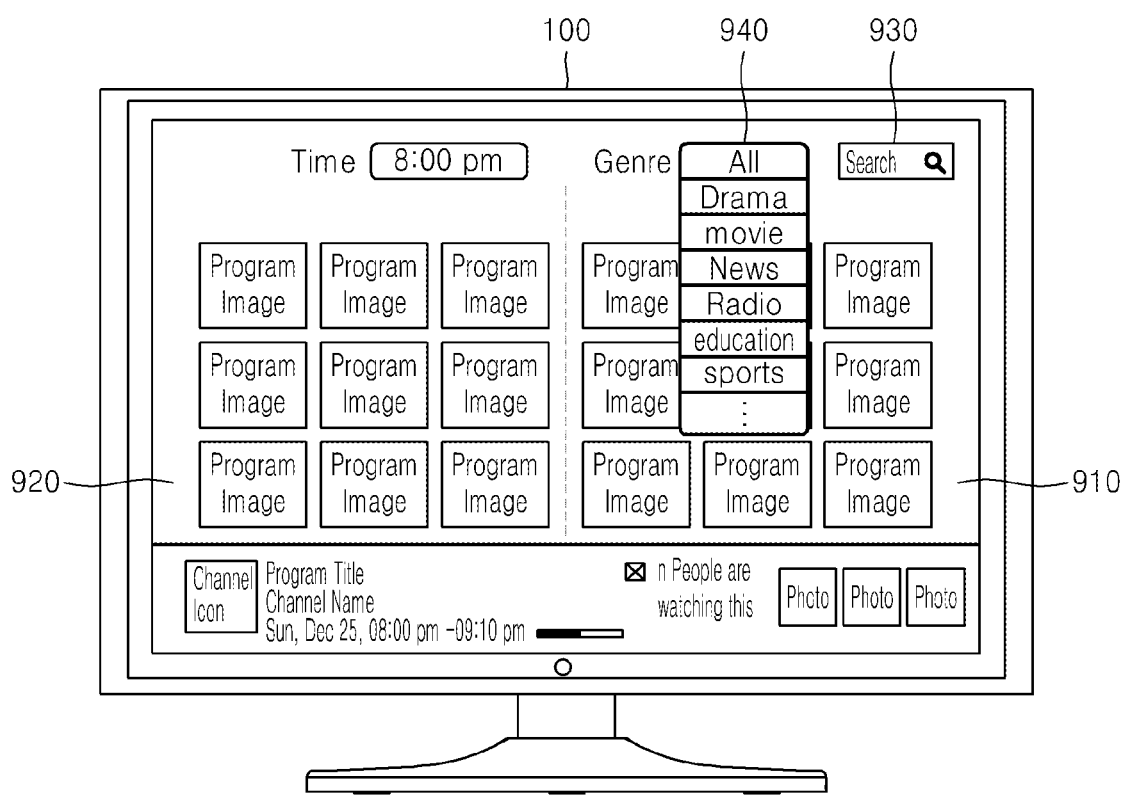
FIG. 9 illustrates a screen related to a search word input (or category selection), according to an exemplary embodiment.

FIG. 9 illustrates a screen related to a search word input (or category selection), according to an exemplary embodiment.

As illustrated in FIG. 9, a user may directly input a search word into a search window 930. When the display device 100 provides a virtual keyboard, the user may input the search word via a touch input with respect to the display device 100. Further, the user may input the search word by using a remote control device (e.g., a TV remote controller or a mobile terminal).

Alternatively, the user may select a category via a selection window 940. The display device 100 may provide various categories, and the categories may be changed based on a user setting. The user may select the category by manipulating the remote control device or by using a button of the display device 100, a touch input, and/or any other suitable mode for user input.

In particular, the display device 100 may display only broadcasting program information in a first region 910, wherein the broadcasting program information corresponds to the search word (or the category) selected by the user, and is from among a plurality of pieces of broadcasting program information that correspond to a predetermined point of time (e.g., 8:00 p.m.). Alternatively, the display device 100 may display only viewing history information and/or recording information in a second region 920, wherein the viewing history information and/or the recording information correspond to the search word (or the category) selected by the user, and are from among a plurality of pieces of viewing history information and/or recording information that are obtained before the predetermined point of time (e.g., 8:00 p.m.).

In the present exemplary embodiment, the display device 100 may display the broadcasting program information that corresponds to the search word (or the category) selected by the user on the first region 910, and may display the viewing history information and/or the recording information that correspond to the search word (or the category) selected by the user on the second region 920.

Figure 10:
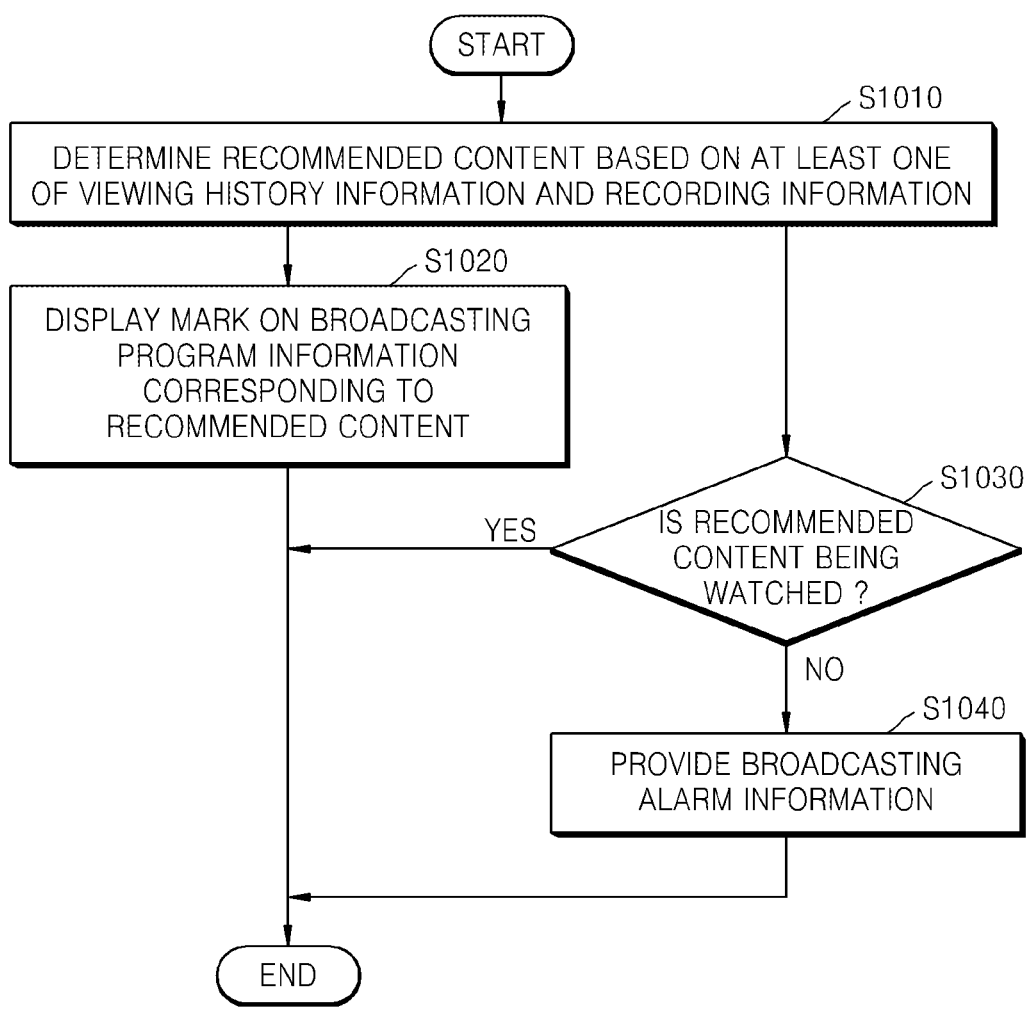
FIG. 10 is a flowchart which illustrates a method for recommending content, according to an exemplary embodiment.

FIG. 10 is a flowchart which illustrates a method for recommending content, according to an exemplary embodiment.

In operation S1010, the display device 100 may determine a recommendation which relates to content based on at least one of viewing history information and recording information. For example, the display device 100 may analyze the viewing history information and/or the recording information, and may extract one or more pieces of broadcasting content based on days and time slots which are watched by a user over a predetermined number of times, or may extract information which relates to desired actors, desired genres, and/or any other suitable criterion for providing a user-specific recommendation. In this case, the display device 100 may determine the recommended content indicating broadcasting content that the user repeatedly watches at a specific time, or may determine the recommended content indicating broadcasting content related to a desired genre in which a desired actor appears.

In the present exemplary embodiment, the display device 100 may determine the recommendation which relates to content based on at least one of viewing history information and recording information which relates to a second user that is related to the first user of the display device 100. For example, the display device 100 may determine the recommended content, based on at least one of viewing history information and recording information which relates to the second user that is related to the first user via a social networking service (SNS). When the second user that is related to the first user via the SNS watches or records content XYZ more than a predetermined number of times (e.g., more than 10 times), the display device 100 may determine the content XYZ as the recommended content. Further, when a predetermined number of users (e.g., approximately 20 users) from among SNS acquaintances watch or record content OOO, the display device 100 may determine the content OOO as the recommended content.

In operation S1020, the display device 100 may display a mark on the broadcasting program information that corresponds to the recommended content. In particular, the display device 100 may display the mark on the broadcasting program information that corresponds to the recommended content and that is from among a plurality of pieces of broadcasting program information which are displayed on a first region. For example, the display device 100 may display the mark on an outline of the broadcasting program information that corresponds to the recommended content, by using a bold line, may increase a size of the broadcasting program information that corresponds to the recommended content, compared to other broadcasting program information, and/or may add an animation effect such as a flickering effect, a star mark, or the like to the broadcasting program information that corresponds to the recommended content. This will be described with reference to FIG. 11.

Figure 11:
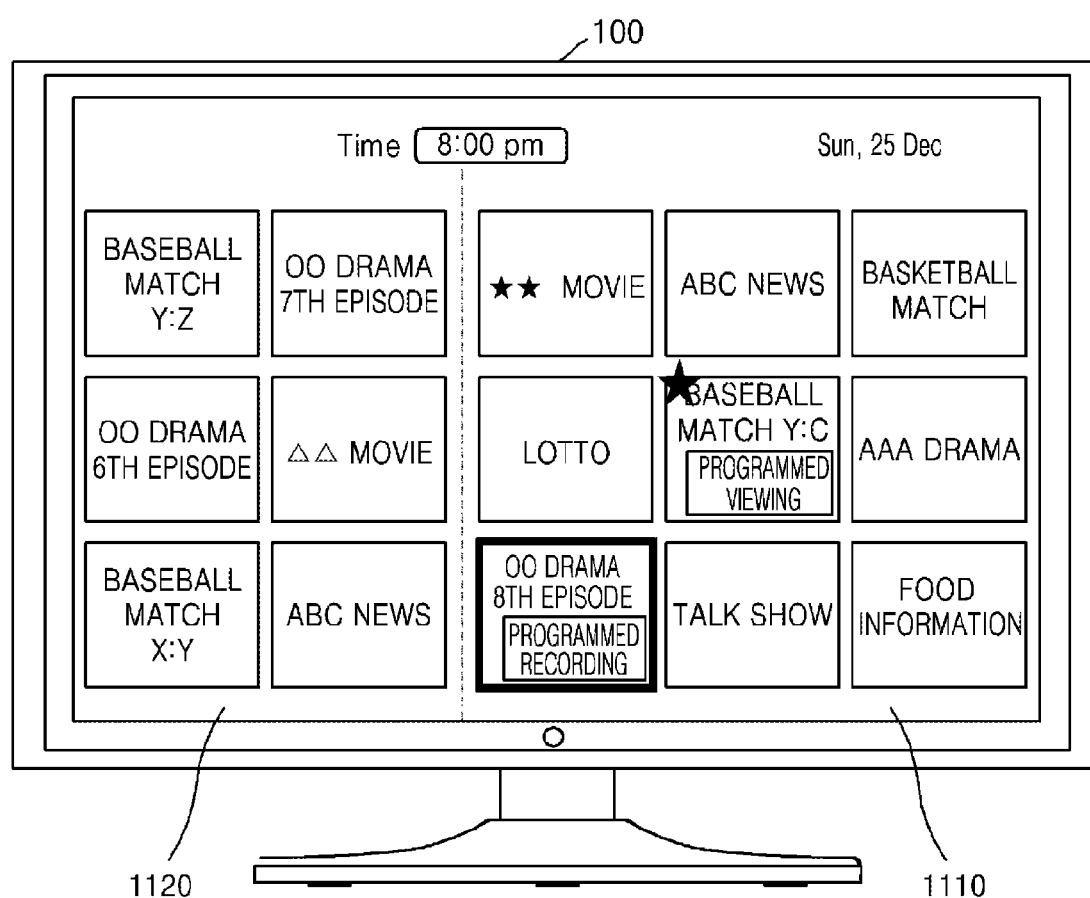
FIG. 11 illustrates a screen for displaying recommended content, according to an exemplary embodiment.

FIG. 11 illustrates a screen for displaying recommended content, according to an exemplary embodiment.

As illustrated in a second region 1120 of FIG. 11, by analyzing viewing history information and/or recording information which relates to a user, it is possible to recognize that the user frequently watches and/or records baseball matches of a team Y, and watches many or all episodes of a drama OO. In this case, the display device 100 may determine a baseball match of the team Y or the drama OO as the recommended content.

Thus, the display device 100 may display a mark with respect to the recommended content on broadcasting program information which relates to "Y vs C baseball match" and on broadcasting program information which relates to "8th episode of the drama OO" from among a plurality of pieces of broadcasting program information on a first region 1110. Then, the display device 100 may also provide a GUI for programmed viewing or programmed recording with respect to the recommended content. When viewing-programmed content starts, the display device 100 may transmit an alarm message to the user, or may automatically change a channel and then may provide the viewing-programmed content to the user.

In the present exemplary embodiment, the recommended content may include not only broadcasting content but also may include any one or more of photos, personal images, music, applications, and/or any other suitable type of content. For example, when the user periodically watches photos of a specific SNS group by using the display device 100, the display device 100 may recommend and show a photo that is newly uploaded to the SNS group. When the user calls his or her family in the U.S.A. every Sunday morning via videotelephony, the display device 100 may recommend a videotelephony application on a Sunday morning. When the user frequently listens to specific music, the display device 100 may determine the specific music as the recommended content.

Referring back to FIG. 10, in operation S1030, the display device 100 may determine whether the recommended content is being watched. If the user does not watch the recommended content via the display device 100, in operation S1040, the display device 100 may provide broadcasting alarm information. The broadcasting alarm information may include any one or more of a recommended content title, broadcasting channel information, a broadcasting start time, and/or any other suitable type of information.

For example, the display device 100 may display broadcasting alarm information which relates to the recommended content on the screen of the display device 100. Further, the display device 100 may transmit the broadcasting alarm information which relates to the recommended content to the external device 300. This will be described with reference to FIGS. 12 and 13.

Figure 12:
FIG. 12 illustrates a screen for displaying broadcasting alarm information, according to an exemplary embodiment.

FIG. 12 illustrates a screen for displaying broadcasting alarm information, according to an exemplary embodiment.

As illustrated in FIG. 12, when a user frequently watches episodes of the drama OO, the display device 100 may determine the drama OO as recommended content and may display broadcasting alarm information which relates to the drama OO on the screen. In a case where an 8th episode of the drama OO starts in one minute but the user is watching another channel, the display device 100 may display broadcasting alarm information which indicates that "8th episode of the drama OO starts in 1 minute, go to CH. 7." In particular, if the user presses an OK button, the display device 100 may change a channel from CH. 9 to CH. 7 and may provide the 8th episode of the drama OO.

Figure 13:
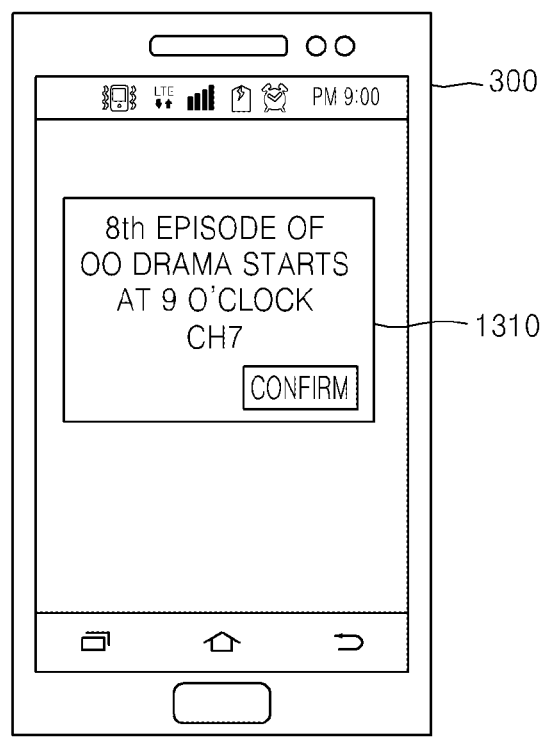
FIG. 13 illustrates a screen for providing broadcasting alarm information to an external device, according to an exemplary embodiment.

FIG. 13 illustrates a screen for providing broadcasting alarm information to the external device 300, according to an exemplary embodiment. In the present exemplary embodiment, when a user does not watch recommended content, the display device 100 may provide the broadcasting alarm information to a mobile terminal of the user. In particular, the broadcasting alarm information may include link information (e.g., a uniform resource identifier (URI)) for providing access to the recommended content.

In the present exemplary embodiment, the display device 100 may automatically record at least one broadcasting program, based on at least one of viewing history information and recording information. For example, when the user does not watch the recommended content that is determined based on the viewing history information and/or the recording information, the display device 100 may automatically record the recommended content.

Figure 14A:
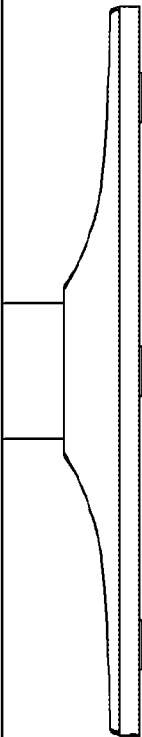
FIGS. 14A and 14B illustrate screens for mapping at least one of watching history information and recording information with respect to a calendar and providing information, according to an exemplary embodiment.
Figure 14B:
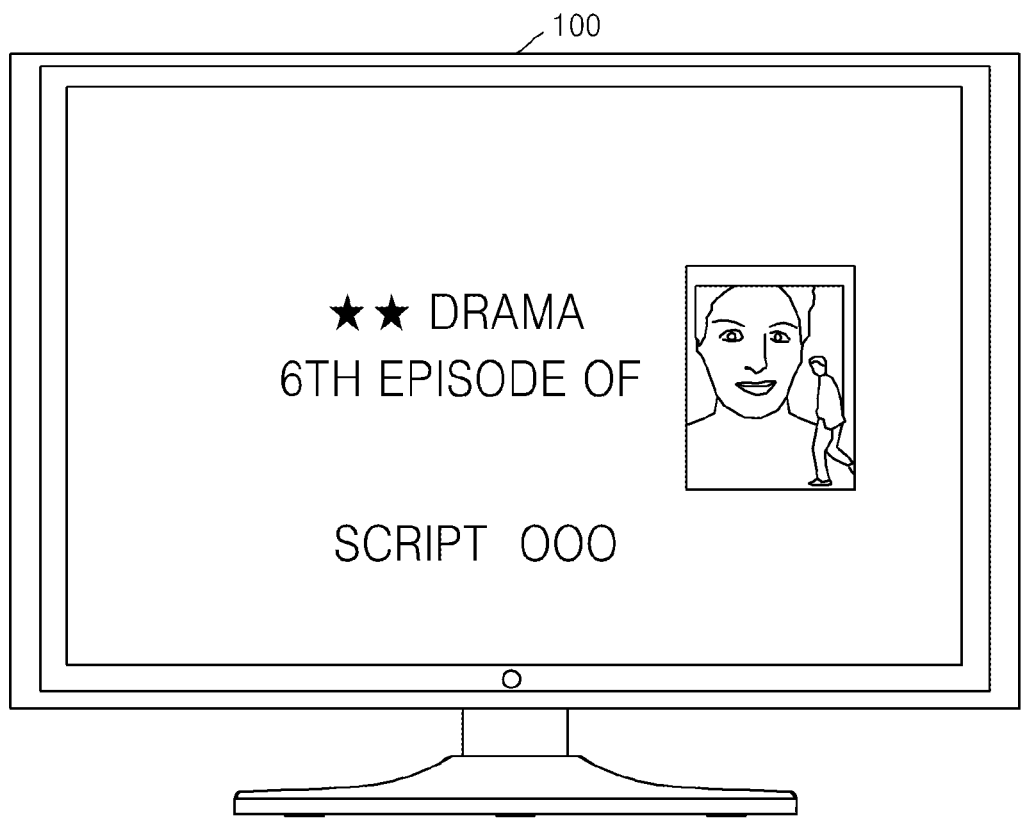

FIGS. 14A and 14B illustrate screens for mapping at least one of viewing history information and recording information with respect to a calendar and providing related information, according to an exemplary embodiment.

As illustrated in FIG. 14A, the display device 100 may map the viewing history information and/or the recording information with respect to the calendar and may display the mapped viewing history information and/or the mapped recording information. In this case, a user may visually recognize a viewing history and a recording history.

Further, the display device 100 may recommend broadcasting content on the calendar, based on the viewing history information and/or the recording information. For example, when today is May 29, and the user has watched every episode of "★★ drama" except for a $6^{th}$ episode, the display device 100 may determine "$9^{th}$ episode of ★★ drama" as the recommended content, wherein the "$9^{th}$ episode of ★★ drama" is scheduled to be broadcast on May 30. Then, the display device 100 may provide a GUI for programmed viewing or programmed recording on the calendar.

Still further, the display device 100 may provide a GUI on the calendar so as to enable the user to watch the "$6^{th}$ episode of ★★ drama," which has not previously been watched by the user, via a VOD, and/or via any other suitable platform. For example, when the user selects "watch" which is displayed on May 17 via a touch input, as shown in FIG. 14A, the display device 100 may directly reproduce the "$6^{th}$ episode of ★★ drama" via a VOD, as shown in FIG. 14B.

In another exemplary embodiment, when the user selects "watch" displayed on May 17 via a touch input, as shown in FIG. 14A, the display device 100 may transmit the "$6^{th}$ episode of ★★ drama" to a mobile terminal of the user.

Figure 15:
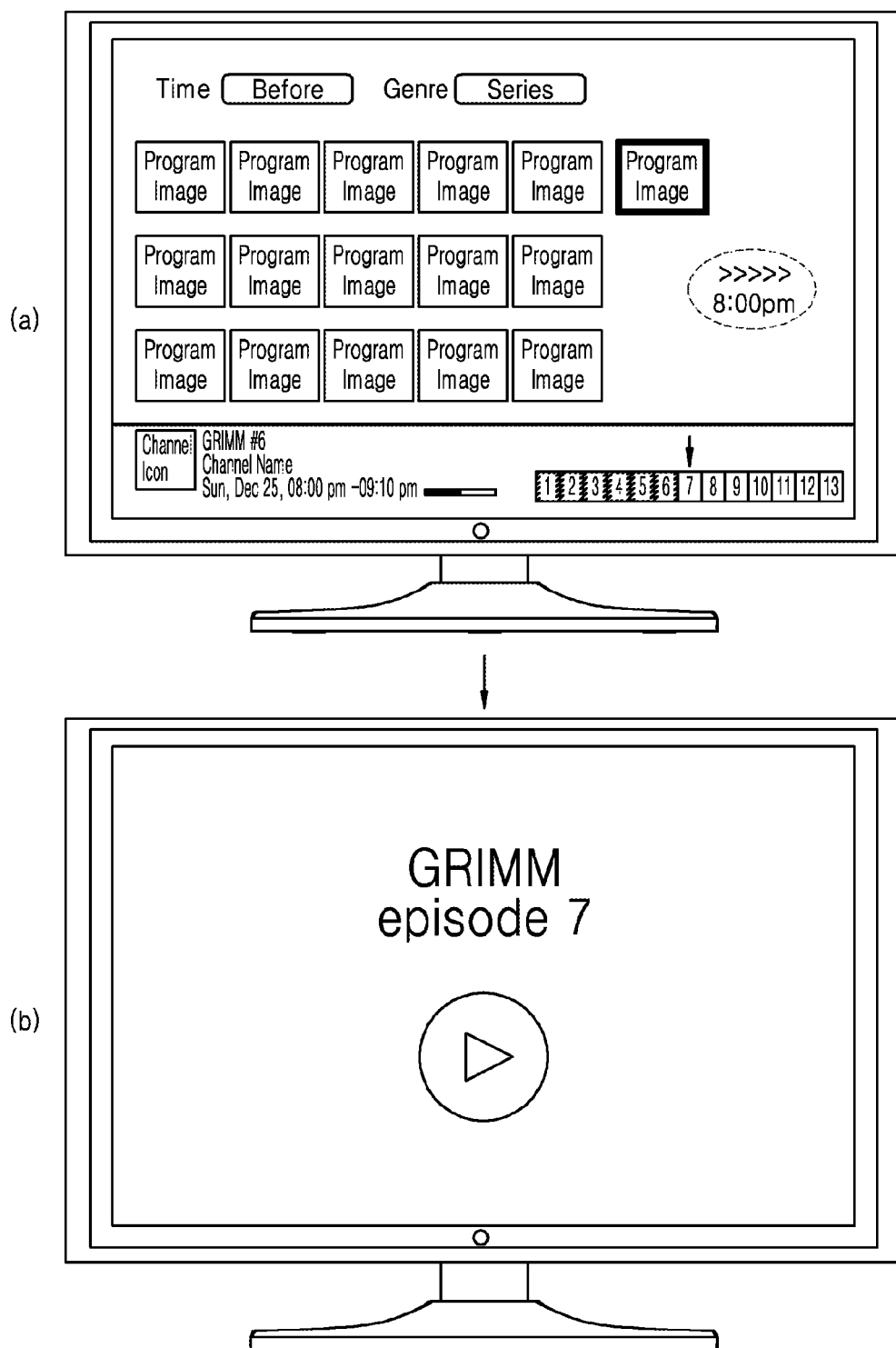
FIG. 15 illustrates screens for providing viewing history information which relates to series-type content, according to an exemplary embodiment.
Figure 16:
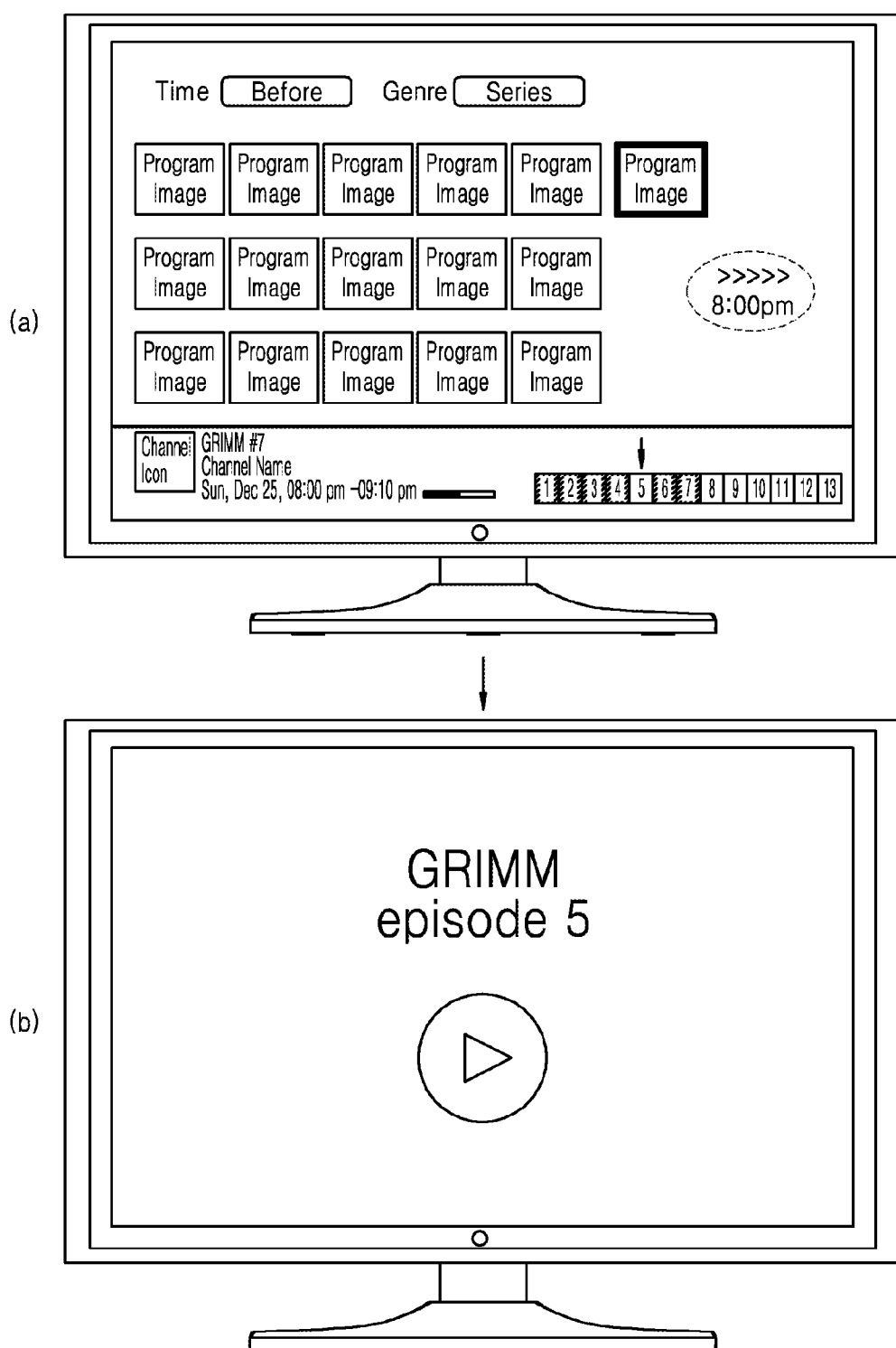
FIG. 16 illustrates screens for providing viewing history information which relates to series-type content, according to another exemplary embodiment.

FIGS. 15 and 16 illustrate screens for providing viewing history information which relates to series-type content, according to an exemplary embodiment.

When a user selects the series-type content in the displayed viewing history information, the display device 100 may display next episode content. For example, it is assumed that the user has watched $1^{st}$ through $6^{th}$ episodes of series-type content, which is titled "GRIMM." When the user selects "GRIMM #6," which is a most recently watched episode, on the viewing history information, as illustrated in FIG. 15(a), the display device 100 may display an episode number (i.e., 7) of a next episode.

Further, the display device 100 may provide a GUI for enabling the user to directly watch the $7^{th}$ episode of "GRIMM." When the user selects the GUI for enabling the user to directly watch the $7^{th}$ episode of "GRIMM," as illustrated in FIG. 15(b), the display device 100 may directly access and reproduce content of the $7^{th}$ episode of "GRIMM."

When the user selects the series-type content in the displayed viewing history information, the display device 100 may display content of a previous episode that was not watched. For example, it is assumed that the user watched the $1^{st}$ through $4^{th}$ episodes of the series-type content, titled "GRIMM," did not watch the $5^{th}$ episode of the series-type content, and then watched the $6^{th}$ and $7^{th}$ episodes of the series-type content. When the user selects "GRIMM #7," which is the most recently watched episode, on the viewing history information, as illustrated in FIG. 16(a), the display device 100 may display the $5^{th}$ episode that was not watched.

Further, the display device 100 may provide a GUI for enabling the user to directly watch the $5^{th}$ episode of "GRIMM." When the user selects the GUI for enabling the user to directly watch the $5^{th}$ episode of "GRIMM," as illustrated in FIG. 16(b), the display device 100 may directly access and reproduce content of the $5^{th}$ episode of "GRIMM."

Thus, according to the present exemplary embodiment, when target content is series-type content, the user may easily access content of a next episode or content of a previous episode that the user did not watch, by using the viewing history information.

Hereinafter, a structure of the display device 100 will be described in detail with reference to FIGS. 17 and 18.

Figure 17:
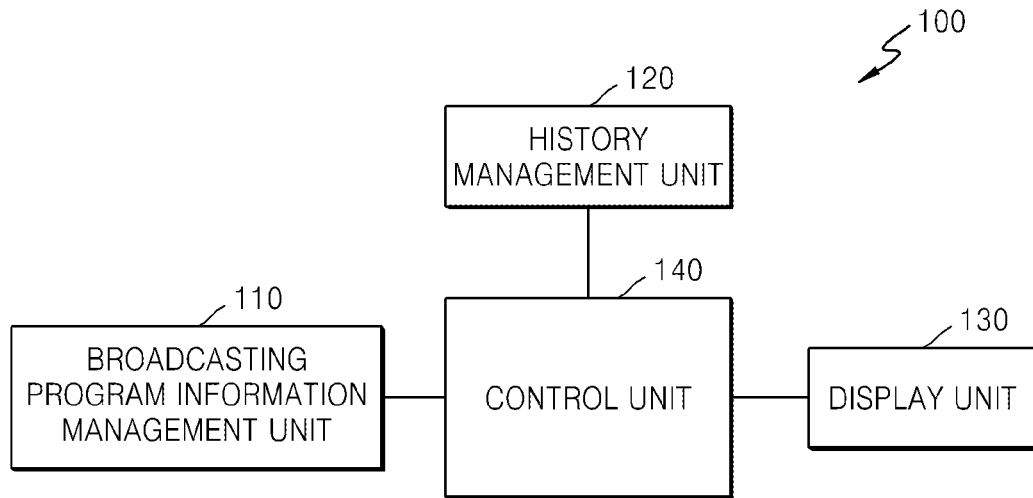
FIG. 17 is a block diagram of the display device, according to an exemplary embodiment.

FIG. 17 is a block diagram of the display device 100, according to an exemplary embodiment.

As illustrated in FIG. 17, the display device 100 may include a broadcasting program information management unit 110, a history management unit 120, a display unit 130, and a control unit 140.

The broadcasting program information management unit 110 may receive at least one piece of broadcasting program information. The broadcasting program information management unit 110 may separately receive only the broadcasting program information in conjunction with a data broadcasting signal from the broadcasting control server 200, or may receive a broadcasting signal which includes a combination of broadcasting content and broadcasting program information and then may extract the broadcasting program information from the broadcasting signal.

The broadcasting program information management unit 110 may configure an EPG by using the received broadcasting program information. In the present exemplary embodiment, the broadcasting program information management unit 110 may monitor that a program that is currently being executed in the display device 100 is being changed to a next program, and when a change is detected, the broadcasting program information management unit 110 may generate a new EPG.

The broadcasting program information management unit 110 may obtain broadcasting program information from the broadcasting control server 200 at regular intervals. Further, the broadcasting program information management unit 110 may request broadcasting program information from the broadcasting control server 200 and may obtain the broadcasting program information.

The broadcasting program information management unit 110 may be a module that is driven in the display device 100 or may be driven in the form of a server which resides outside the display device 100.

The history management unit 120 may obtain viewing history information which relates to content that was previously watched. The history management unit 120 may obtain the viewing history information which relates to the content that was watched over a predetermined time period. When a watched time period is less than the predetermined time period, this indicates that a user has selected a channel by mistake or has briefly watched content while in the process of changing channels, so that the history management unit 120 manages only the content which was watched for more than the predetermined time period as a viewing history.

In the present exemplary embodiment, the history management unit 120 may also obtain information which relates to content that was watched via the external device 300. In this case, the history management unit 120 may directly receive viewing history information from the external device 300 via wired or wireless communication, or may receive the viewing history information from an external server.

Further, the history management unit 120 may obtain recording information which relates to content that was previously recorded. In the present exemplary embodiment, the recorded content may include at least one of content that was recorded by a user during viewing and content that was recorded as a result of pre-programming.

In the present exemplary embodiment, the history management unit 120 may delete viewing history information and/or recording information that were generated before a predetermined point of time. For example, the history management unit 120 may delete viewing history information and/or recording information that were generated at least five years ago, and thus may efficiently manage a memory.

The history management unit 120 may manage viewing history information and/or recording information for each of a plurality of users. In particular, when a plurality of pieces of ID information about the users are registered in the display device 100, and one of the users logs in by using user ID information and then watches or records content, the history management unit 120 may manage the respective viewing history information and/or the respective recording information for each of the users. For example, the history management unit 120 may manage the viewing history information and/or the recording information for each of family members, e.g., a mother, a father, a son, and a daughter.

In the present exemplary embodiment, the user ID information may include any one or more of an ID, a nickname, a telephone number, and/or any other suitable types of identification information which are related to the user, and when the user uses a mobile terminal as a remote control device, the user ID information may further include one or more of a device ID, a unique serial number, a MAC address, an IMEI, or the like with respect to the remote control device.

In the present exemplary embodiment, the history management unit 120 may be embodied as a module that is driven in the display device 100, or may be driven in the form of a server which resides outside the display device 100.

The display unit 130 displays and outputs information that is processed in the display device 100. For example, the display unit 130 may display broadcasting program information which corresponds to a predetermined point of time on a first region of a screen, and may display at least one of viewing history information and recording information on a second region of the screen. In particular, the display unit 130, by using a time table form, may display the broadcasting program information which corresponds to the predetermined point of time on the first region that is in a first direction with respect to a position that corresponds to the predetermined point of time, and may display at least one of the viewing history information and the recording information on the second region that is in a second direction with respect to the position that corresponds to the predetermined point of time.

In the present exemplary embodiment, the predetermined point of time may include a present point of time. Further, in the present exemplary embodiment, with respect to the position that corresponds to the predetermined point of time, the first direction may be a rightward direction and the second direction may be a leftward direction. In particular, the display unit 130 may display broadcasting program information which relates to current content in a right-side region, and may display viewing history information and/or recording information about previous content in a left-side region, wherein the right-side region and the left-side region are divided with respect to a current temporal axis. However, it will be apparent to one of ordinary skill in the art that an arrangement of the broadcasting program information, the viewing history information, and the recording information may vary.

The display unit 130 may display the broadcasting program information which corresponds to the predetermined point of time on the first region for a predetermined time interval. Further, the display unit 130 may array the viewing history information which relates to content that was watched before the predetermined point of time and the recording information which relates to content that was recorded before the predetermined point of time on a second region for a predetermined time interval.

In the present exemplary embodiment, the display unit 130 may lattice-array the broadcasting program information, the viewing history information, and the recording information. In another exemplary embodiment, the display unit 130 may map the viewing history information and/or the recording information with respect to a calendar and display the viewing history information and/or the recording information based on a result of the mapping.

In the present exemplary embodiment, the display unit 130 may display the viewing history information, which corresponds to a search word or a category received from a user, on the second region. In addition, in the present exemplary embodiment, the display unit 130 may display the recording information, which corresponds to a search word or a category received from a user, on the second region.

When the predetermined point of time is changed, the display unit 130 may display at least one of viewing history information and recording information on the second region, wherein the viewing history information relates to content that was watched before the changed predetermined point of time, and the recording information relates to content that was recorded before the changed predetermined point of time. In particular, according to the present exemplary embodiment, when the predetermined point of time is changed, the viewing history information and/or the recording information that are to be displayed may be changed.

The display unit 130 may provide respective viewing history information and/or respective recording information with respect to each of a plurality of users. In particular, when ID information which relates to one of the users is input, the display unit 130 may display viewing history information and/or recording information that corresponds to the input ID information of the user in the second region.

In the present exemplary embodiment, the display unit 130 may display a mark on broadcasting program information that corresponds to recommended content and that is from among a plurality of pieces of broadcasting program information displayed on the first region, so as to indicate that the broadcasting program information relates to the recommended content. The mark may be manifested by any one or more of varying a color, using a bold outline, adding a specific icon, adding a graphical effect, and/or any other suitable mode for providing a mark.

In the present exemplary embodiment, when a user selection with respect to content included in at least one of viewing history information and recording information that are displayed on the second region is received, the display unit 130 may display additional information which corresponds to the selection and/or the selected content on a screen. The additional information may include any one or more of a title of a broadcasting program, a name of a channel, broadcasting times (i.e., a start time, an end time, and a running time), a grade, a type of a program, a representative image, detailed information (e.g., cast, a director, a producer, re-broadcasting information, a synopsis, a preview menu, and a prelisten menu), and/or any other suitable type of information. In addition, when the selected content is series-type content, the display unit 130 may provide content which relates to a next episode or may provide information which relates to a previous episode that was not watched. Further, the display unit 130 may provide the user with a user interface (UI) that enables the user to easily access the content of the next episode or the previous episode that the user did not watch, so that the user may easily access the content of the next episode or the previous episode that the user did not watch.

In the present exemplary embodiment, when the display unit 130 and a touchpad form a layer structure, and thus are formed as a touch screen, the display unit 130 may be used as both an output device and an input device. The display unit 130 may include at least one of a liquid crystal display (LCD), a thin film transistor-liquid crystal display (TFT-LCD), an organic light-emitting display device, a flexible display, a three-dimensional (3D) display, and an electrophoretic display. Depending on the way the display device 100 is embodied, two or more display units 130 may exist.

The control unit 140 controls all operations of the display device 100. In particular, the control unit 140 may generally control the broadcasting program information management unit 110, the history management unit 120, and the display unit 130.

The control unit 140 may extract at least one of metadata which relates to content that was watched and metadata which relates to content that was recorded before a predetermined point of time. The metadata may include information which relates to a watched time and information which relates to a recorded time. Thus, the display device 100 may array the viewing history information and the recording information in a temporal order, by using the metadata which relates to the watched content and the metadata which relates to the recorded content.

The control unit 140 may change the predetermined point of time, based on a user input.

In the present exemplary embodiment, the control unit 140 may automatically record at least one piece of content, based on at least one of viewing history information and recording information. In particular, the control unit 140 may analyze the viewing history information and the recording information and then may automatically record content that the user frequently watches (e.g., watches over 90% of the content) or records. For example, when the user typically watches ABC news at 8:00 p.m. most days, but when power is off at 8:00 p.m. on a particular day, the control unit 140 may automatically record ABC news on that particular day.

Figure 18:
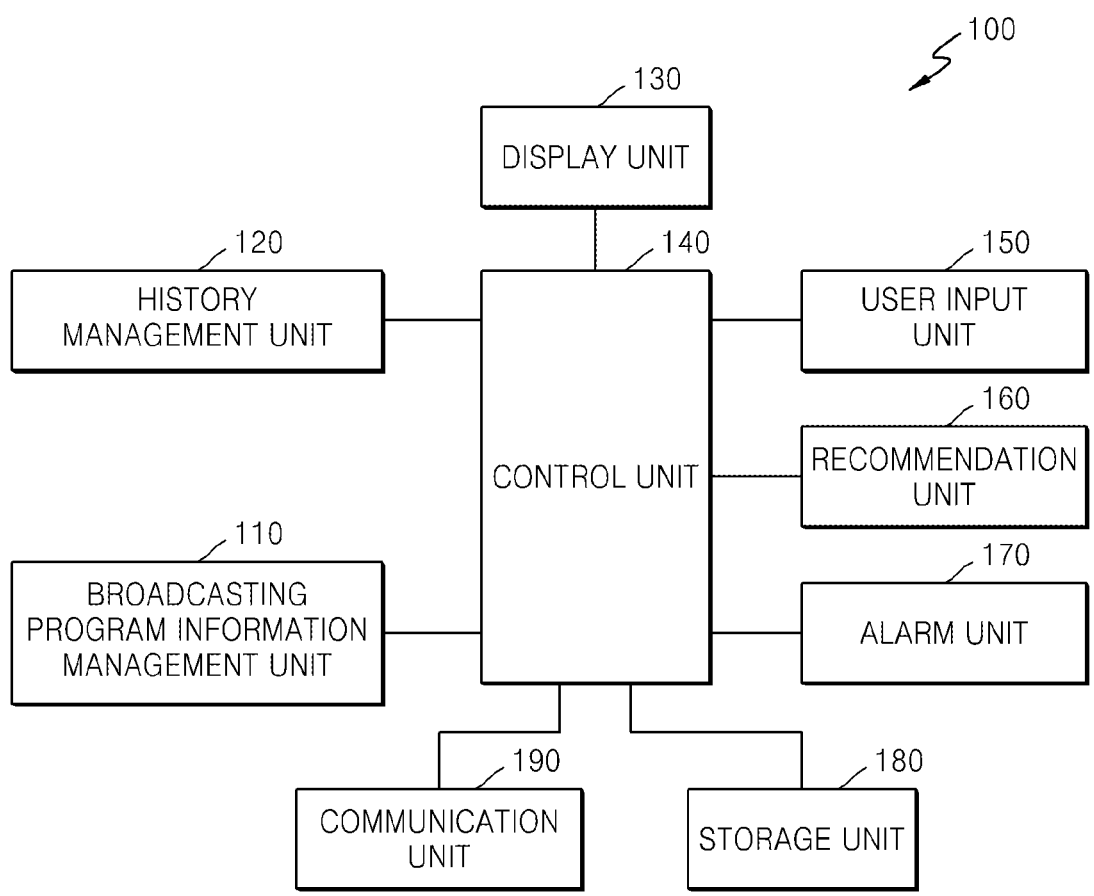
FIG. 18 is a block diagram of the display device, according to another exemplary embodiment.

FIG. 18 is a block diagram of the display device 100, according to another exemplary embodiment. The display device 100 according to the present exemplary embodiment may include a broadcasting program information management unit 110, a history management unit 120, a display unit 130, and a control unit 140, and may further include a user input unit 150, a recommendation unit 160, an alarm unit 170, a storage unit 180, and a communication unit 190. In particular, the control unit 140 may control operations of the user input unit 150, the recommendation unit 160, the alarm unit 170, the storage unit 180, and the communication unit 190.

Descriptions about the broadcasting program information management unit 110, the history management unit 120, the display unit 130, and the control unit 140 of the exemplary embodiment illustrated in FIG. 18 are the same as descriptions about those of the exemplary embodiment illustrated in FIG. 17, and thus will be omitted here.

The user input unit 150 indicates a means by which a user inputs data so as to control the display device 100. For example, the user may control power to be on or off, a change of channel, volume adjustment, or the like via the user input unit 150.

The user input unit 150 may be embodied as any one or more of a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezoelectric effect type touch pad, or the like), a jog wheel, a jog switch, and/or any other suitable type of device which is configured to receive an input from a user. In particular, when the touch pad and the display unit 130 form a mutual layer structure, this structure may be called a touch screen.

In the present exemplary embodiment, the user input unit 150 may include a remote control device which is usable for controlling the display device 100 from a remote place. The remote control device may include any one or more of a TV remote controller, an integrated remote controller, a mobile terminal (e.g., a mobile phone, a smart phone, a tablet PC, an MP3 player, or the like) that has a remote control function, and/or any other suitable type of device for providing control functions remotely.

Further, the user input unit 150 may include one or more modules which are configured to receive data from a user. For example, the user input unit 150 may include at least one of a motion recognition module, a touch recognition module, a voice recognition module, and/or any other suitable type of module.

The motion recognition module may recognize motion of the remote control device or the user, and may transmit information which relates to the recognized motion to the control unit 140. In the present exemplary embodiment, the motion recognition module may recognize motion of the remote control device or the user by using a camera. In the present exemplary embodiment, the camera may include one or more of a depth camera, a multi-view camera, and/or any other suitable type of camera. The depth camera may measure distance information which relates to objects within a scene in real-time by using Time-of-Flight (TOF) technology, and a measured value may be output as a depth image to be used in making a high quality depth map of the scene.

The touch recognition module may recognize a touch gesture on the touch screen and may transmit information which relates to the touch gesture to the control unit 140. In order to recognize a touch or a proximate touch on the touch screen, the touch screen may include various sensors which may be arranged internally or externally with respect to the touch screen. An example of a sensor which is configured to detect the touch on the touch screen may include a tactile sensor. The tactile sensor detects a contact of a specific object at least as much as a person can detect. The tactile sensor may detect various types of information, such as, for example, at least one of roughness of a contact surface, hardness of the contact object, temperature of a contact point, and/or any other relevant type of information.

Further, another example of a sensor which is configured to detect the touch on the touch screen may include a proximity sensor.

The proximity sensor detects an existence and/or a presence of an object that approaches a predetermined detection surface or that is positioned nearby, by using a force of an electro-magnetic field or an infrared ray, without using a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, and/or any other suitable type of sensor. The touch gesture of the user may include any one or more of a tap gesture, a touch & hold gesture, a double tap gesture, a drag gesture, a panning gesture, a flick gesture, a drag & drop gesture, and/or any other suitable type of touch gesture.

The voice recognition module may recognize a voice of the user by using a voice recognition engine, and may transmit the recognized voice to the control unit 140.

In the present exemplary embodiment, the user input unit 150 may receive a search word from the user. Further, the user input unit 150 may receive a selection input with respect to a category from the user. In particular, the user input unit 150 may receive a selection input with respect to a sub-category or with respect to a plurality of categories.

Further, the user input unit 150 may receive a selection input with respect to at least one piece of broadcasting program information from among a plurality of pieces of broadcasting program information that are displayed on a first region. Still further, the user input unit 150 may receive a selection input with respect to at least one piece of content which is included in viewing history information and/or recording information that are displayed on a second region.

The user input unit 150 may receive a user input with respect to a change in a predetermined point of time and/or may receive ID information which relates to the user.

The recommendation unit 160 may determine a recommendation with respect to content based on at least one of viewing history information and recording information. For example, the recommendation unit 160 may analyze the viewing history information and/or the recording information, and may extract one or more pieces of broadcasting content based on days and time slots which are watched by the user over a predetermined number of times, or may extract information which relates to one or more of a desired actor, a desired genre, and/or any other relevant criterion for determining a recommendation with respect to content. In this case, for example, the recommendation unit 160 may determine the recommended content based on broadcasting content that the user repeatedly watches at a specific time, or may determine the recommended content based on broadcasting content related to a desired genre in which a desire actor appears.

The recommendation unit 160 may determine the recommended content, based on at least one of viewing history information and recording information which relates to a second user that is related to the first user of the display device 100. An example of a second user that is related to the first user may include SNS acquaintances.

The alarm unit 170 may display broadcasting alarm information which relates to the recommended content on the screen. Further, the alarm unit 170 may transmit the broadcasting alarm information which relates to the recommended content to the external device 300. The broadcasting alarm information may include at least one of a title of the recommended content, broadcasting channel information, a broadcasting start time, access path information (e.g., a URI) with respect to the recommended content, and/or any other suitable type of information.

The storage unit 180 may store programs for processing and controlling operations which are executable by the control unit 140. Further, the storage unit 180 may perform a function for storing input/output data. For example, the storage unit 180 may store the broadcasting program information, the viewing history information, the recording information, recommended content information, and/or any other suitable type of data.

The storage unit 180 may include any one or more of a flash memory-type storage medium, a hard disk-type storage medium, a multimedia card micro-type storage medium, a card type memory (e.g., an SD card memory or an XD card memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc. Further, the display device 100 may operate a web storage system that performs a storing function on the Internet.

The communication unit 190 may include one or more configuring elements that facilitate communication between the display device 100 and an external server (e.g., the broadcasting control server 200), and/or communication between the display device 100 and the external device 300. For example, the communication unit 190 may include one or more of a broadcasting reception module, a mobile communication module, a wireless internet module, a wired internet module, an NFC module, and/or any other suitable type of module.

The broadcasting reception module receives a broadcasting signal and/or broadcasting-related information from the broadcasting control server 200 via a broadcasting channel. The broadcasting channel may include at least one of a satellite channel and a terrestrial channel. The broadcasting-related information may include information which relates to at least one of a broadcasting channel, a broadcasting program, and/or a broadcasting service provider. The broadcasting signal may include not only a TV broadcasting signal, a radio broadcasting signal, and a data broadcasting signal but may also include a broadcasting signal obtained by combining the data broadcasting signal and one of the TV broadcasting signal and the radio broadcasting signal.

The mobile communication module exchanges a wireless signal with at least one of a base station, the external device 300, and the external server via a mobile communication network. The wireless internet module is configured for accessing the Internet wirelessly. The wireless internet module may be embedded in the display device 100 or may be arranged outside the display device 100. For example, there may be a wireless local area network (LAN) (e.g., Wi-Fi). The wireless LAN (Wi-Fi) may include an infrastructure mode in which an access point (AP) that transmits a wireless signal exchanges data with a plurality of terminals within a predetermined range with respect to the AP, and an ad-hoc mode in which terminals mutually exchange data via a peer-to-peer (P2P) connection without routing the data via the AP. The wired internet module is configured for providing access to the internet via a wired connection.

The NFC module is configured for providing NFC. Examples of the NFC may include, but are not limited to, Bluetooth, ZigBee, WFD, UWB, and IrDA.

Bluetooth is a standard which is used by wireless communication devices for performing wireless communication at low power over a short range. UWB is a wireless technology for transmission of a large amount of digital data via a wide spectrum frequency in a short period at low power.

NFC is related to NFC wireless access that is performed by inducing a magnetic field between devices which are positioned at a near proximity with respect to each other, and allows communication in any direction. WFD is a new version of Wi-Fi technology and is characterized by direct communication between devices. In particular, if devices include WFD installed therein, the devices may communicate with each other and share information directly, without using any of a hotspot, a router, an AP, or the like. Further, WFD does not require a pairing procedure as required for Bluetooth, allows long-distance communication of up to approximately 200 meters, and allows 1:N communication with several devices.

ZigBee indicates one of the IEEE 802.15.4 standards that support NFC. ZigBee is a technology for NFC within a distance range of approximately between 10 meters and 20 meters and ubiquitous computing in wireless networking for a house or an office.

According to the one or more exemplary embodiments described above, a user may easily check not only the broadcasting program information but also may check the viewing history information and the recording information. In addition, according to the one or more exemplary embodiments, the user may conveniently perform programmed viewing or programmed recording which relates to content that the user frequently watches, by using the viewing history information and the recording information that are displayed on the display device, and may easily reproduce and watch content that was previously watched or recorded.

The present inventive concept may also be embodied as programmed commands to be executed in various computer means, and may then be recorded in a transitory or non-transitory computer readable recording medium. The computer readable recording medium may include one or more of the programmed commands, data files, data structures, or the like. The programmed commands recorded onto the computer readable recording medium may be particularly designed or configured with respect to one or more exemplary embodiments, or may be well known to one of ordinary skill in the art. Examples of the non-transitory computer readable recording medium include magnetic media including hard disks, magnetic tapes, and floppy disks, optical media including compact disk-read-only memory (CD-ROMs) and digital versatile disks (DVDs), magneto-optical media including floptical disks, and a hardware apparatus which is designed to store and execute the programmed commands in read-only memory (ROM), random-access memory (RAM), flash memories, and/or any other suitable type of medium. Examples of the programmed commands include not only machine codes generated by a compiler but also include great codes to be executed in a computer by using an interpreter.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:
1. A method for providing information which is performable by using a display device, the method comprising:
  determining at least a first piece of content that was watched before a predetermined point of time from among a plurality of broadcasting programs which were broadcasted before the predetermined point of time;
  obtaining viewing history information which relates to the determined at least first piece of content that was watched before the predetermined point of time;
  displaying at least one piece of broadcasting program information which is related to at least one broadcasting program to be broadcasted after the predetermined point of time on a first region of the display device based on the predetermined point of time, and display- ing the viewing history information on a second region of the display device based on the predetermined point of time, receiving an input for selecting a particular content that is displayed in the first region or the second region; and displaying additional information which corresponds to the selected particular content on a third region of the display device, the third region being different from the first region and the second region, wherein the third region partially overlaps with at least one from among the first region and the second region, and wherein the viewing history information, the at least one piece of broadcasting program information which is related to the at least one broadcasting program to be broadcasted, and the additional information which corresponds to the selected particular content are displayed concurrently.

2. The method of claim 1, wherein the displaying comprises displaying the at least one piece of broadcasting program information which corresponds to the predetermined point of time on the first region that is arranged in a first direction with respect to a position that corresponds to the predetermined point of time, and displaying the viewing history information and recording information which relates to at least a second piece of content that was recorded before the predetermined point of time on the second region that are arranged in a second direction with respect to the position that corresponds to the predetermined point of time.

3. The method of claim 2, wherein the displaying the viewing history information and the recording information comprises:

extracting metadata which relates to at least one of the at least first piece of content that was watched before the predetermined point of time and the at least second piece of content that was recorded before the predetermined point of time;

arraying the at least one of the viewing history information and the recording information on the second region for a predetermined time interval, based on the extracted metadata; and adjusting the predetermined time interval, based on information which relates to an amount of elapsed time.

4. The method of claim 2, wherein the displaying the viewing history information and the recording information comprises:

receiving a search word from a user; and displaying at least one of viewing history information which corresponds to the search word and recording information which corresponds to the search word on the second region.

5. The method of claim 2, wherein the displaying the viewing history information and the recording information comprises:

receiving user identification (ID) information; and displaying at least one of viewing history information which corresponds to the user ID information and recording information which corresponds to the user ID information on the second region.

6. The method of claim 2, further comprising:

determining a recommendation with respect to content, based on the at least one of the viewing history information and the recording information; and displaying a mark on broadcasting program information that corresponds to the recommendation from among the at least one piece of broadcasting program information which is displayed on the first region.

7. The method of claim 1, wherein the displaying the at least one piece of broadcasting program information comprises arraying the at least one piece of broadcasting program information which corresponds to the predetermined point of time on the first region for a predetermined time interval.

8. The method of claim 1, wherein the viewing history information comprises information which relates to content that is watchable via an external device.

9. The method of claim 1, further comprising automatically recording at least one piece of broadcasting content, based on the viewing history information.

10. The method of claim 1, wherein the displaying the additional information comprises, when the selected particular content relates to a current episode of a series-type content, displaying at least one of information which relates to a previously broadcasted episode and information which relates to an episode that is to be broadcasted in the future, on the screen of the display device.

11. A display device comprising:

a controller which is configured to determine at least a first piece of content that was watched before a predetermined point of time from among a plurality of broadcasting programs which were broadcasted before the predetermined point of time and obtain viewing history information which relates to the determined at least first piece of content that was watched before the predetermined point of time;

a display which is configured to display at least one piece of broadcasting program information which is related to at least one broadcasting program to be broadcasted after the predetermined point of time on a first region based on the predetermined point of time, and which is configured to display the viewing history information on a second region based on the predetermined point of time; and a user interface which is configured to receive an input for selecting a particular content that is displayed in the first region or the second region, wherein the controller which is further configured to control the display to display additional information which corresponds to the selected particular content on a third region, the third region being different from the first region and the second region, and wherein the third region partially overlaps with at least one from among the first region and the second region, and wherein the viewing history information, the at least one piece of broadcasting program information which is related to the at least one broadcasting program to be broadcasted, and the additional information which corresponds to the selected particular content are displayed concurrently.

12. The display device of claim 11, wherein the display is further configured to display the at least one piece of broadcasting program information which corresponds to the predetermined point of time on the first region that is arranged in a first direction with respect to a position that corresponds to the predetermined point of time, and is further configured to display the viewing history information and recording information which relates to at least a second piece of content that was recorded before the predetermined point of time on the second region that is arranged in a second direction with respect to the position that corresponds to the predetermined point of time.

13. The display device of claim 12, wherein the controller is further configured to extract metadata which relates to at least one of the at least first piece of content that was watched before the predetermined point of time and the at least second piece of content that was recorded before the predetermined point of time, and the display is further configured to array the viewing history information and the recording information on the second region for a predetermined time interval, based on the extracted metadata.

14. The display device of claim 13, wherein the controller is further configured to adjust the predetermined time interval, based on information which relates to an amount of elapsed time.

15. The display device of claim 12, wherein the user interface is further configured to receive a search word from a user, and wherein the display is further configured to display at least one of viewing history information which corresponds to the search word and recording information which corresponds to the search word on the second region.

16. The display device of claim 12, wherein the user interface is further configured to receive user identification (ID) information, and wherein the display is further configured to display viewing history information which corresponds to the user ID information and recording information which corresponds to the user ID information on the second region.

17. The display device of claim 12, wherein the controller is further configured to determine a recommendation with respect to content, based on the at least one of the viewing history information and the recording information, and wherein the display is configured to display a mark on broadcasting program information that corresponds to the recommendation from among the at least one piece of broadcasting program information which is displayed on the first region.

18. The display device of claim 11, wherein the viewing history information comprises information which relates to content that is watchable via an external device.

19. The display device of claim 11, wherein, when the selected particular content relates to a current episode of a series-type content, the display is further configured to display at least one of information which relates to a previously broadcasted episode and information which relates to an episode that is to be broadcasted in the future, on the screen of the display device.

20. A non-transitory computer-readable recording medium having recorded thereon a program which, when executed by a processor, implements the method of claim 1.

* * * * *